(12) United States Patent
Ogawa et al.

(10) Patent No.: US 7,725,631 B2
(45) Date of Patent: May 25, 2010

(54) INFORMATION SYSTEM AND INFORMATION STORAGE METHOD OF INFORMATION SYSTEM

(75) Inventors: Yukio Ogawa, Tokyo (JP); Junji Ogawa, Sagamihara (JP); Shinji Kimura, Sagamihara (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 140 days.

(21) Appl. No.: 11/971,527

(22) Filed: Jan. 9, 2008

(65) Prior Publication Data

US 2008/0307120 A1 Dec. 11, 2008

(30) Foreign Application Priority Data

Jun. 11, 2007 (JP) ............................... 2007-153497

(51) Int. Cl.
*G06F 13/12* (2006.01)
*G06F 13/38* (2006.01)

(52) U.S. Cl. ........................... 710/74; 711/161; 711/162

(58) Field of Classification Search .................... 710/74; 711/161–162
See application file for complete search history.

(56) References Cited

U.S. PATENT DOCUMENTS

| | | | |
|---|---|---|---|
| 6,088,697 A * | 7/2000 | Crockett et al. ............... | 707/10 |
| 6,643,750 B2 * | 11/2003 | Achiwa et al. ............... | 711/162 |
| 7,013,371 B2 * | 3/2006 | Watanabe et al. ........... | 711/161 |
| 7,082,506 B2 * | 7/2006 | Nakano et al. ............... | 711/162 |
| 2002/0120785 A1 | 8/2002 | Somalwar | |
| 2003/0120685 A1 | 6/2003 | Duncombe | |
| 2003/0217278 A1 * | 11/2003 | Kimura et al. ............... | 713/189 |
| 2004/0078630 A1 | 4/2004 | Niles et al. | |
| 2005/0071589 A1 | 3/2005 | Tross et al. | |
| 2005/0235016 A1 | 10/2005 | Amano | |
| 2005/0240637 A1 | 10/2005 | Kawamura | |
| 2006/0095696 A1 * | 5/2006 | Amano et al. ................ | 711/162 |
| 2006/0230216 A1 | 10/2006 | Fuente | |

* cited by examiner

*Primary Examiner*—Henry W. H. Tsai
*Assistant Examiner*—Eric T Oberly
(74) *Attorney, Agent, or Firm*—Brundidge & Stanger, P.C.

(57) ABSTRACT

Provided is an information system for preserving data of a storage device in a computer that repeats the connection to and disconnection from a communication network. The computer acquires data to be written into the storage device and manages the update status of the storage device, transfers the data written into the storage device to the storage controller independent from the writing of data into the storage device when the computer is in a communicable state with the storage controller, and discontinues the transfer of data written into the storage device to the storage controller and manages the transfer status when the computer is not in a communicable state with the storage controller.

10 Claims, 17 Drawing Sheets

FIG.3

| VOL-ID 301 | PATH INFORMATION 302 | VOL TYPE 303 | PAIR INFORMATION 304 | PAIR STATUS 305 | FINAL COPY TIME 306 | FINAL COPY BLOCK ID 307 |
|---|---|---|---|---|---|---|
| 1 | ‥ | PRIMARY | ‥ | SUSPEND | ‥ | ‥ |
| 2 | ‥ | PRIMARY | ‥ | PAIR | ‥ | ‥ |
| 3 | ‥ | — | — | SIMPLEX | — | — |
| ⋮ | ⋮ | ⋮ | ⋮ | ⋮ | ⋮ | ⋮ |

| BLOCK ID ~901 | BIT INFORMATION ~902 | BLOCK UPDATE TIME ~903 | COPY START TIME ~904 | COPY END TIME ~905 | WRITE DATA MANAGEMENT INFORMATION ADDRESS ~906 |
|---|---|---|---|---|---|
| 1 | 0 | – | – | – | – |
| 2 | 1 | .. | .. | .. | 0x1A |
| : | : | : | : | : | : |

| VOL-ID ~301(2) | BLOCK ID ~901(2) | BIT POSITION ~1001 | SUBSEQUENT WRITE DATA MANAGEMENT INFORMATION ADDRESS ~906(2) | TOP ADDRESS ~1003 | AREA LENGTH ~1004 |
|---|---|---|---|---|---|
| 1 | 2 | – | – | 32 | 64 |
| 2 | .. | .. | .. | .. | .. |
| : | : | : | : | : | : |

INFORMATION SYSTEM AND INFORMATION STORAGE METHOD OF INFORMATION SYSTEM

CROSS REFERENCES

This application relates to or claims priority from Japanese Patent Application No. 2007-153497, filed on Jun. 11, 2007, the entire disclosure of which is incorporated herein by reference.

BACKGROUND

1. Technical Field

The present invention generally relates to a computer comprising a storage function for storing data of a storage device, and particularly relates to a computer comprising a data replication function or remote copy function (hereinafter referred to as the "remote copy function") for transferring data of the storage device to an external storage controller.

2. Description of the Related Art

A client-use computer such as a personal computer to be used by a user for running application programs such as document processing is basically configured the same as a server-use computer such as a web server or an email server that executes application programs for providing service to a plurality of users, and is configured from computer resources such as a CPU, a memory, a hard disk, a network connection and the like.

A client-use computer generally has limited computational resources in comparison to a server-use computer. In addition, when the client-use computer is a portable computer such as a laptop (notebook) computer, there are many cases where the client-use computer is subject to physical shock and damaged while it is being carried around.

A computer stores an operating system, application programs and user data in a storage device such as a hard disk, and the operating system reads application programs and user data from the storage device into a memory, updates the user data and the like, and writes the same into the storage device according to instructions from the user.

As technology for preserving this kind of data, for example, RAID (Redundant Arrays of Inexpensive Disks) technology for collectively managing a plurality of hard disks as a single hard disk is well known, and it is primarily implemented in a server-use computer.

In light of the failure rate of client-use computers, it is also necessary to take measures for reliably preserving data as with server-use computers, but since the foregoing RAID technology requires a plurality of hard disks, it is inappropriate for use in client-use computers with limited computational resources.

Thus, technology has been disclosed for using a bitmap table corresponding to the data area of a storage apparatus and transferring the data of a first storage to a second storage (e.g., US Patent Application Publication No. 2005/0071589).

Also disclosed is technology of acquiring write data from a first storage and transferring such write data to a second storage (e.g., US Patent Application Publication No. 2004/0078630)

SUMMARY

The conventional technologies as described above are effective when communication between the first storage and the second storage is maintained, but they do not give any consideration to a situation where a communicable state and an incommunicable state are repeated. Thus, these technologies are inappropriate for the foregoing situation.

In addition, the conventional technologies described above are effective when the processing to be performed by an application program read from the first storage and the processing of transferring the data of the first storage to the second storage use separate computational resources, but they do not give any consideration to a situation of sharing the computational resources. Thus, these technologies are inappropriate for the foregoing situation.

The present invention is made in view of the foregoing problems. Thus, an object of the present invention is to provide an information system capable of preserving the data written into a storage device such as a hard disk in a computer even when such computer, for example a portable computer, is subjected to a situation where connection to and disconnection from a communication network is repeated.

Another object of the present invention is to provide an information system capable of executing data transfer processing of storage devices without interrupting the processing performed by application programs and the like even when the processing to be performed by an application program and the processing of transferring the data written into the storage device are to share computer resources.

In order to achieve the foregoing objects, one aspect of the present invention provides an information system comprising a computer having a storage device, a storage controller, and a communication network. The computer acquires data to be written into the storage device and manages the update status of the storage device, transfers the data written into the storage device to the storage controller independent from the writing of data into the storage device when the computer is in a communicable state with the storage controller, and discontinues the transfer of data written into the storage device to the storage controller and manages the transfer status when the computer is in an incommunicable state with the storage controller. The computer further controls the transfer of data written into the storage device to the storage controller according to the usage of a computational resource provided in the computer.

According to the present invention, it is possible to provide an information storage method that matches the conditions even in an information system configured from a portable computer, or a computer with limited computational resources such as a CPU.

DESCRIPTION OF DRAWINGS

FIG. 3 is an explanatory diagram of a volume management table;

DETAILED DESCRIPTION

Figure 1:
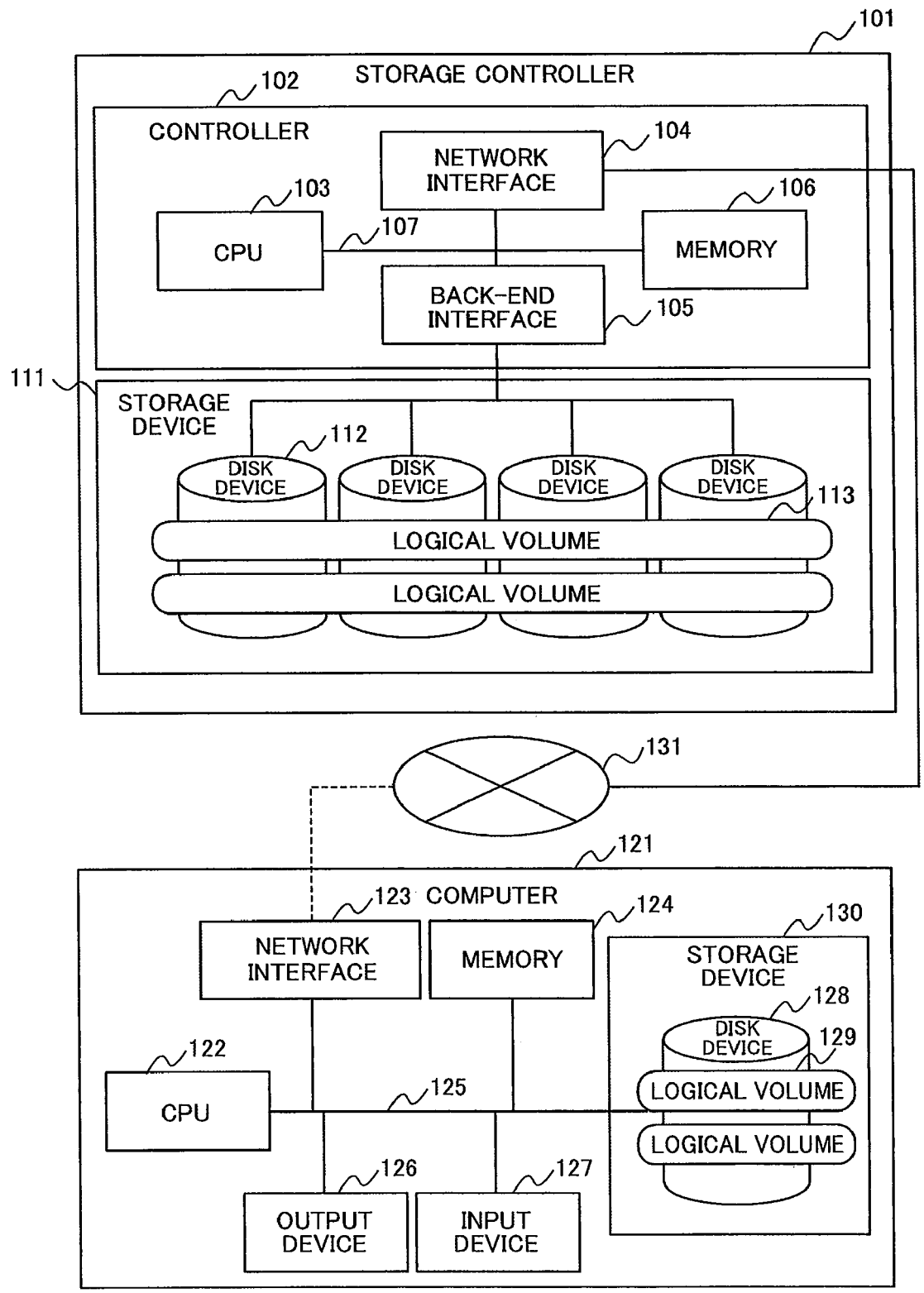
FIG. 1 is a schematic configuration diagram of an information system according to an embodiment of the present invention.

Embodiments of the present invention are now explained with reference to the attached drawings. The same reference numerals in the respective drawings represent identical or equivalent components. Similar components are sometimes differentiated by adding a suffix to the reference numerals as a matter of convenience for the ensuing explanation.

FIG. 1 is a schematic diagram of the system configuration to which an embodiment of the present invention is applied.

As shown in FIG. 1, the information system of this embodiment is configured from a computer 121, a storage controller 101, and a communication network 131.

The storage controller 101 is continuously connected to the communication network 131. Meanwhile, the computer 121 is not necessarily connected to the network 131 at all times, and repeats a connected status and an unconnected status. The computer 121 is therefore in a situation of repeating a communicable state and an incommunicable state with the storage controller 101 alternately.

The communication network 131 is a standard communication network that transfers communication packets according to an IP protocol or the like, and is configured from the Internet, Intranet, or an integrated communication network of the Internet and Intranet.

The computer 121 may be configured the same as a standard computer. Specifically, the computer 121 comprises computational resources including a CPU 122, a memory 124, a storage device 130, and a network interface 123. The computer 121 additionally comprises internal signal lines 125, an output device 126, and an input device 127.

The CPU 122 is a processor for performing various types of processing by executing programs stored in the memory 124.

The memory 124, for example, is a volatile memory that enables high-speed access, and stores the programs to be executed by the CPU 122, and information required by the CPU 122.

The storage device 130 comprises a disk 128. The disk 128, for example, is a storage device such as a SATA (Serial Advanced Technology Attachment) disk drive. A plurality of logical volumes 129 are set in the disk 128 and store an operating system, application programs and a variety of information such as user data.

Alternatively, the storage device 130 may comprise a nonvolatile semiconductor memory. The nonvolatile semiconductor memory, for example, is a flash memory. Although the ensuing explanation of the embodiments describes a case where the storage device 130 comprises the disk 128, the disk 128 may be substituted with a nonvolatile semiconductor memory, and the same effect can also be yielded in this case.

The disk 128 or the storage device 130 including the disk 128 may be equipped with a security function. The security function is provided in the management OS 214 or the management program 211 explained later, and these may perform processing to the logical volume 129. A security function refers to a function for preventing acts such as divulgence by furtive glance, destruction or falsification by a third party of a variety of information such as user data stored in the logical volume 129.

For example, a security function is a function for encrypting data of the logical volume 129 coupled with a TPM (Trusted Platform Module) chip or the like. Further, a security function may also be a function for prohibiting access to the logical volume 129 or a function for erasing data of the logical volume 129 when a pre-set time limit has lapsed. A security function may also be a function for prohibiting access to the logical volume 129 or a function for erasing data of the logical volume 129 when the battery power of the computer 121 falls below a pre-set value. A security function may also be a function for prohibiting access to the logical volume 129 or a function for erasing data of the logical volume 129 when there is communication from the storage controller 128 or other apparatuses.

One logical volume 129 of the disk 128 in the computer 121 forms a pair for remote copy with one logical volume 113 of the disk device 112 in the storage controller 101 explained later. Access from the computer 121 to the logical volume 113 is conducted by using a communication protocol such as an iSCSI (Internet Small Computer System Interface) protocol.

The network interface 123 is connectable to the storage controller 101 via the communication network 131, and sends and receives data and control signals to and from the computer 121 based on TCP/IP during a connection status.

The internal signal line 125, for example, is a bus. The internal signal line 125 mutually connects the CPU 122, the memory 124, the disk 128, the network interface 123, the output module 126, and the input module 127.

The output device 126 is a device for displaying a variety of information and, for example, is a display.

The input device 127 is a device to be used by a user for inputting a variety of information and, for example, is a keyboard or a mouse.

The storage controller 101 primarily comprises a controller 102 and a storage device 111.

The controller 102 comprises a CPU 103, a memory 106, a network interface 104, and a back-end interface 105, and the storage device 111 comprises a plurality of disks 112.

The disk device 112 is a storage device such as an FC (Fiber Channel) disk drive, a SATA (Serial Advanced Technology Attachment) disk drive, a PATA (Parallel Advanced Technology Attachment) disk drive, a FATA (Fiber Attached Technology Adapted) disk drive, a SAS (Serial Attached SCSI) disk drive, or a SCSI (Small Computer System Interface) disk drive. The storage device 111 may be configured from a nonvolatile semiconductor memory, or configured from a combination of the foregoing disk drive and nonvolatile semiconductor memory. The nonvolatile semiconductor memory, for example, is a flash memory.

The disk device 112, the storage device 111 including the disk device 112, or the controller 102 may be equipped with a security function. Here, a security function provided to the disk device 112, the storage device 111 including the disk device 112, or the controller 102 refers to a function for preventing information stored in the logical volume 129 of the computer 121 and which may have been subject to acts such as divulgence by furtive glance, destruction or falsification by a third party from being reflected in the logical volume 113 when such information has been transferred to the storage controller 101.

In other words, a security function is a function for preventing the reception of information of the logical volume 129 which may have been subject to acts such as divulgence by furtive glance, destruction or falsification by a third party, or a function for deleting the received information when such information is received, or a function for deleting the written information when such information is written into the logical volume 113, or a function for deleting all data of the logical volume 113 storing the written information when such information is written into the logical volume 113.

This security function may also be a function for restricting access to the logical volume 113 when a pre-set time limit has lapsed, a function for deleting information that was transferred to the logical volume 113 at such time limit, or a function for deleting the written portion or all data of the logical volume 113 to which the transferred information is written at such time limit. The security function may also be a function for prohibiting access to the logical volume 113 when the computer 121 does not respond or provides an erroneous response to an inquiry from the storage controller 101 or other apparatuses, a function for deleting the information transferred to the logical volume 113 in the foregoing case, or a function for deleting the written portion or all data of the logical volume 113 to which the transferred information is written.

The controller 102 can control the plurality of disks 112 in the storage device 111 according to a RAID level (e.g., 0, 1, or 5) prescribed based on a so-called RAID system. With the RAID system, the plurality of disks 112 are managed as a single RAID group, and a plurality of logical volumes 113, which are access units from the computer 121, are defined in the RAID group. An LUN (Logical Unit Number) is allocated to the respective logical volumes 113.

The CPU 103 is a processor for controlling the I/O processing (data reading or data writing) to the plurality of disks 112 in response to the data I/O request from the computer 121.

The memory 106, for example, is a volatile memory that enables high-speed access, and stores various microprograms and management tables of the logical volume 113.

The network interface 104 is connectable to the computer 121 via the communication network 131, and sends and receives data and control signals to and from the computer 121 based on TCP/IP during a connection status.

The back-end interface 105 is a controller for controlling the connection with the disk device 112, and controls the data I/O request to the disk device 112 based on a protocol for controlling the disk device 112.

The internal signal line 107, for example, is a bus. The internal signal line 107 interconnects the CPU 103, the memory 106, the back-end interface 105, and the network interface 104.

Figure 2:
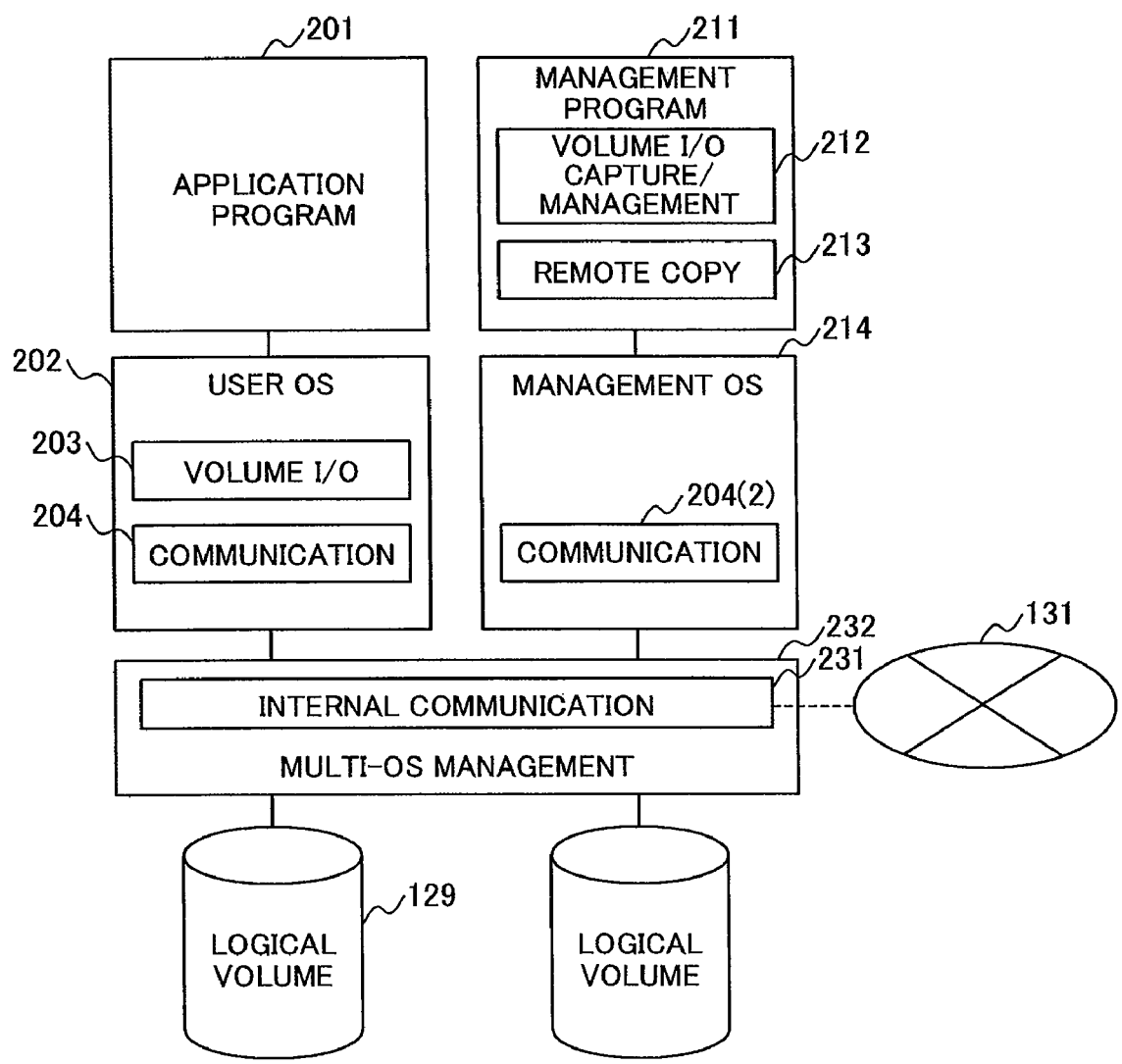
FIG. 2 is a functional configuration diagram of a computer according to an embodiment of the present invention.

FIG. 2 is a functional block diagram of the computer 121 according to an embodiment of the present invention.

In the computer 121, a user OS (Operating System) 202 and a management OS 214 are executed independently. To be executed independently refers to the user OS 202 and the management OS 214 logically or physically partitioning and using the computer resources of the computer 121 such as the CPU 122, the memory 124, the network interface 123, and the disk 128 so that their mutual execution will not affect other executions. The foregoing user OS 202 and the management OS 214 are allocated to the partitioned resources described above.

The logical volumes 129 in the disk 128 are allocated to the respective OSes in units of logical volumes 129 such as two logical volumes being allocated to the user OS (Operating System) 202 and one logical volume being allocated to the management OS 214.

The processing for executing the plurality of OSes is performed with the multi-OS management function 232. The user OS 202 and the management OS 214 are independently executed with the multi-OS management function 232, and the management OS 214 can continue processing even when the user OS 202 halts due to a failure or the like.

Communication between the user OS 202 and the management OS 214 is conducted through an internal communication function 231, which is a virtual network provided in the multi-OS management function 232. When the computer 121 and the communication network 131 are connected, communication between each OS and the communication network 131 is executed through the internal communication function 231.

The user OS 202 comprises, among others, a volume I/O function 203 and a communication function 204. The user OS 202 also provides application programs 201 such as a text editing program, an email editing and transmission/reception program, and a web browsing program to the user. The user OS 202 processes the access from the application program 201 to the logical volume 129 through the volume I/O function 203 and the communication function 204.

The management OS 214 comprises, among others, a communication function 204(2), and executes a management program 211 comprising a volume I/O capture/management function 212 and a remote copy function 213. Processing based on the volume I/O capture/management function 212 and the remote copy function 213 will be explained later.

FIG. 3 is an explanatory diagram showing a volume management table to be used by the management OS 214 of the computer 121.

The volume management table, for example, can be stored in the memory 124 of the computer 121, or retained in an area of the logical volume 129.

The volume management table includes information concerning the logical volume 129, and the logical volume 113, as a paired volume in its remote copy, and is composed of a VOL-ID 301, path information 302, a volume type 303, pair information 304, a pair status 305, a final copy time 306, and a final copy block ID 307.

The VOL-ID 301 is a number that is uniquely decided for identifying the logical volume 129 in the computer 121.

The path information 302 is set using information regarding access path to the logical volume 129.

The volume type 303, for example, is either "primary" or "secondary." A volume set with a "primary" type indicates that it is used as a primary volume (copy source volume) in remote copy. The volume set with a "secondary" type indicates that it is used as a secondary volume (copy destination volume) in remote copy. Other attributes may also be adopted.

In the following explanation, although a case is explained where several of the logical volumes 129 of the computer 121 are used as primary volumes and several of the logical volumes 113 of the storage controller 101 are used as secondary volumes, several of the logical volumes 129 of the computer 121 may be used as secondary volumes and several of the logical volumes 113 of the storage controller 101 may be used as primary volumes.

The pair information 304 is set using information for specifying the paired volume for forming a copy pair; for example, the ID of the storage controller having a volume to become a pair, and the VOL-ID and path information of a volume to become a pair.

The pair status 305, for example, sets using PAIR, SUSPEND, SIMPLEX, and the like. PAIR shows a status where two volumes are forming a copy pair, and the storage contents of the primary volume are reflected in the secondary data volume. SUSPEND shows a status where the copy pair is cancelled, and the data update arising in the copy source volume is being differentiated and managed in the copy source. SIMPLEX shows that the volume is a standard volume that is not taking part in the copy pair.

Based on the remote copy function 213 implemented in the computer 121, the pair status 304 concerning the logical volume 129 is updated to COPY in accordance with the start-up of the remote copy processing from the logical volume 129 of the computer 121 to the logical volume 113 of the corresponding storage controller 101, and the pair status 304 concerning the logical volume 129 is updated to SUSPEND pursuant to the termination of remote copy processing.

In the final copy time 306, the time that copy was lastly executed from the primary volume to the secondary volume, or the final confirmation time when the update status for copy processing was confirmed but copy was not necessary since no update was made is registered. Alternatively, a counter value using the TPM (Trusted Platform Module) provided in the computer 121, instead of the foregoing time, may be registered in the final copy time 306.

In the final copy block ID 307, the ID (explained later) of the final block area copied from the primary volume to the secondary volume, or the ID of the final block area wherein the update status for copy processing was confirmed but copy was not necessary since no update was made is registered.

The storage controller 101 also retains a volume management table that is similar to the volume management table of the computer 121 shown in FIG. 3. The storage controller 101 can store this volume management table in the memory 106 or the like, or retain the volume management table in an area of the logical volume 113.

The volume management table of the storage controller 101 includes information concerning the logical volume 113, and the logical volume 129 that is a paired volume in remote copy, and is configured from a VOL-ID 301, path information 302, an attribute 303, pair information 304, a pair status 305, a final copy time 306, a final copy block ID 307 and the like.

The pair status 305 in the volume management table of the storage controller 101 is updated to COPY in accordance with the start of remote copy processing from the computer 121 to the storage controller 101, and updated to SUSPEND in accordance with the termination of remote copy processing.

Based on the remote copy function 213 provided in the computer 121, the pair status 304 concerning the logical volume 113 is updated to COPY in accordance with the start-up of the remote copy processing from the logical volume 129 of the computer 121 to the logical volume 113 of the corresponding storage controller 101, and the pair status 304 concerning the logical volume 113 is updated to SUSPEND pursuant to the termination of remote copy processing.

Alternatively, the pair information 305 may be fixed to SUSPEND according to instructions from the administrator of the storage controller 101. Here, in response to the remote copy request from the logical volume 129 of the computer 121 to the logical volume 113 of the storage controller 101, the storage controller 101 does not respond or responds by notifying communication denial.

Figure 4:
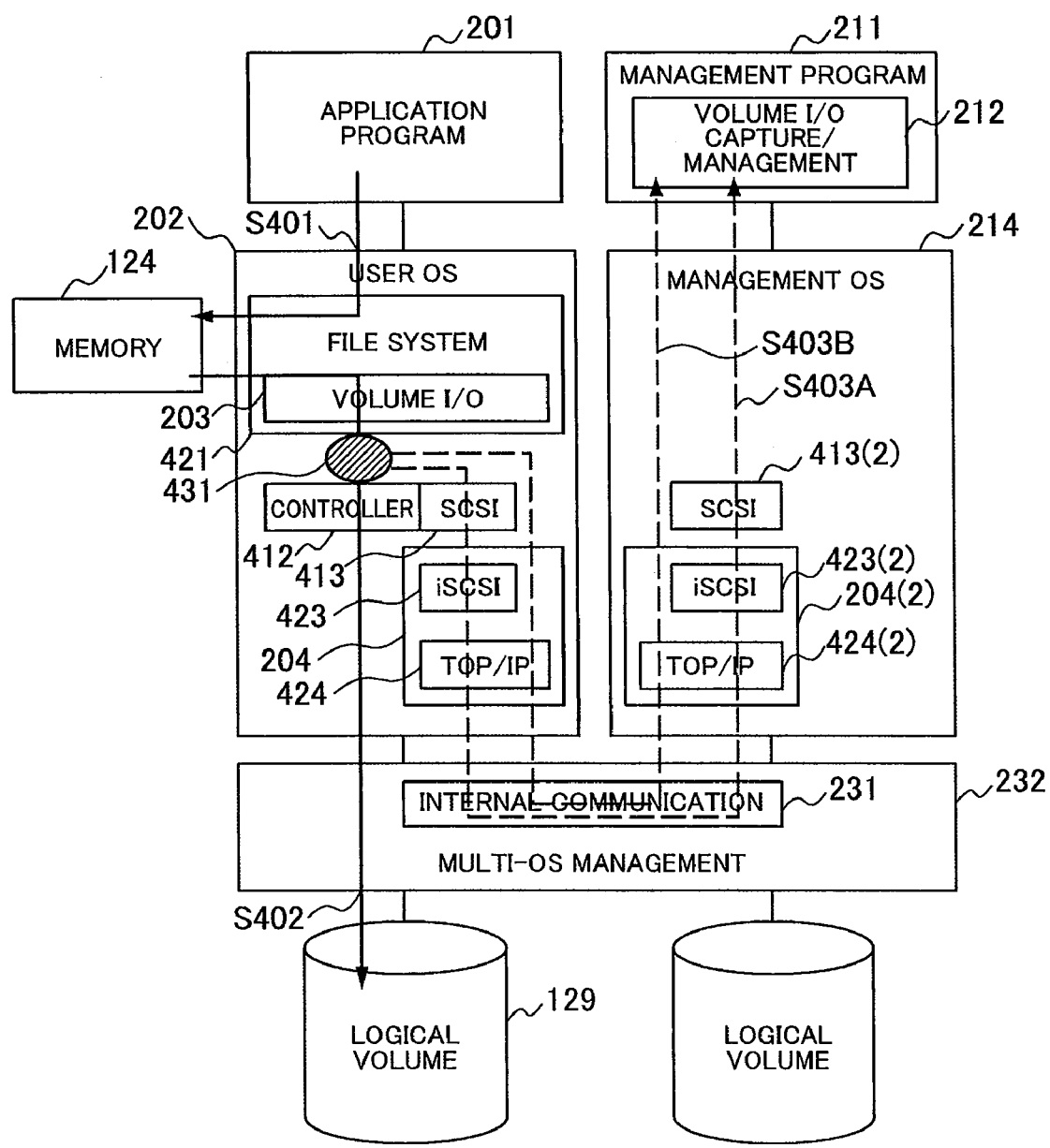
FIG. 4 is an explanatory diagram in a case of acquiring the volume I/O on the side of the user OS.
Figure 5:
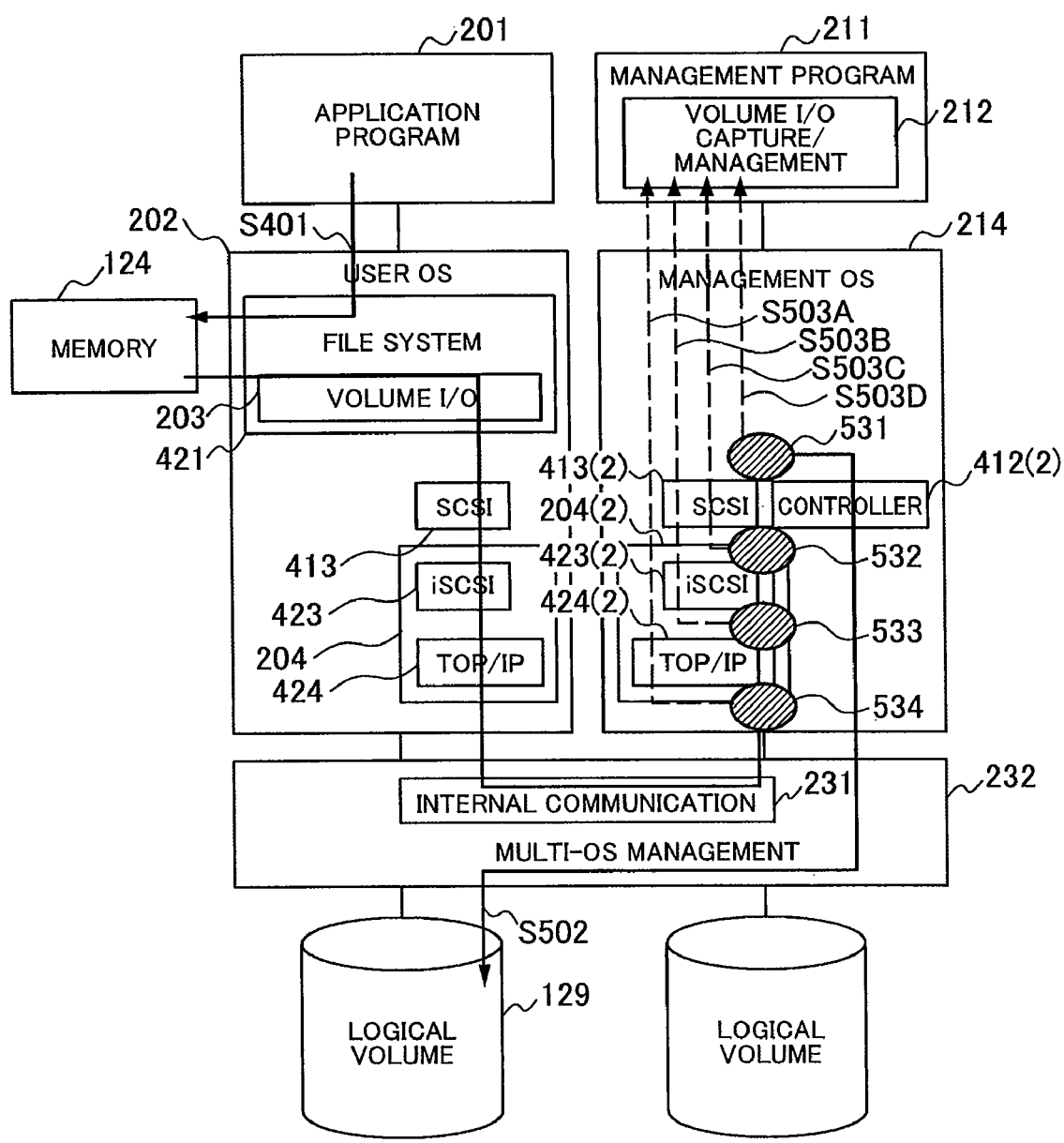
FIG. 5 is an explanatory diagram in a case of acquiring the volume I/O on the side of the management OS.
Figure 6:
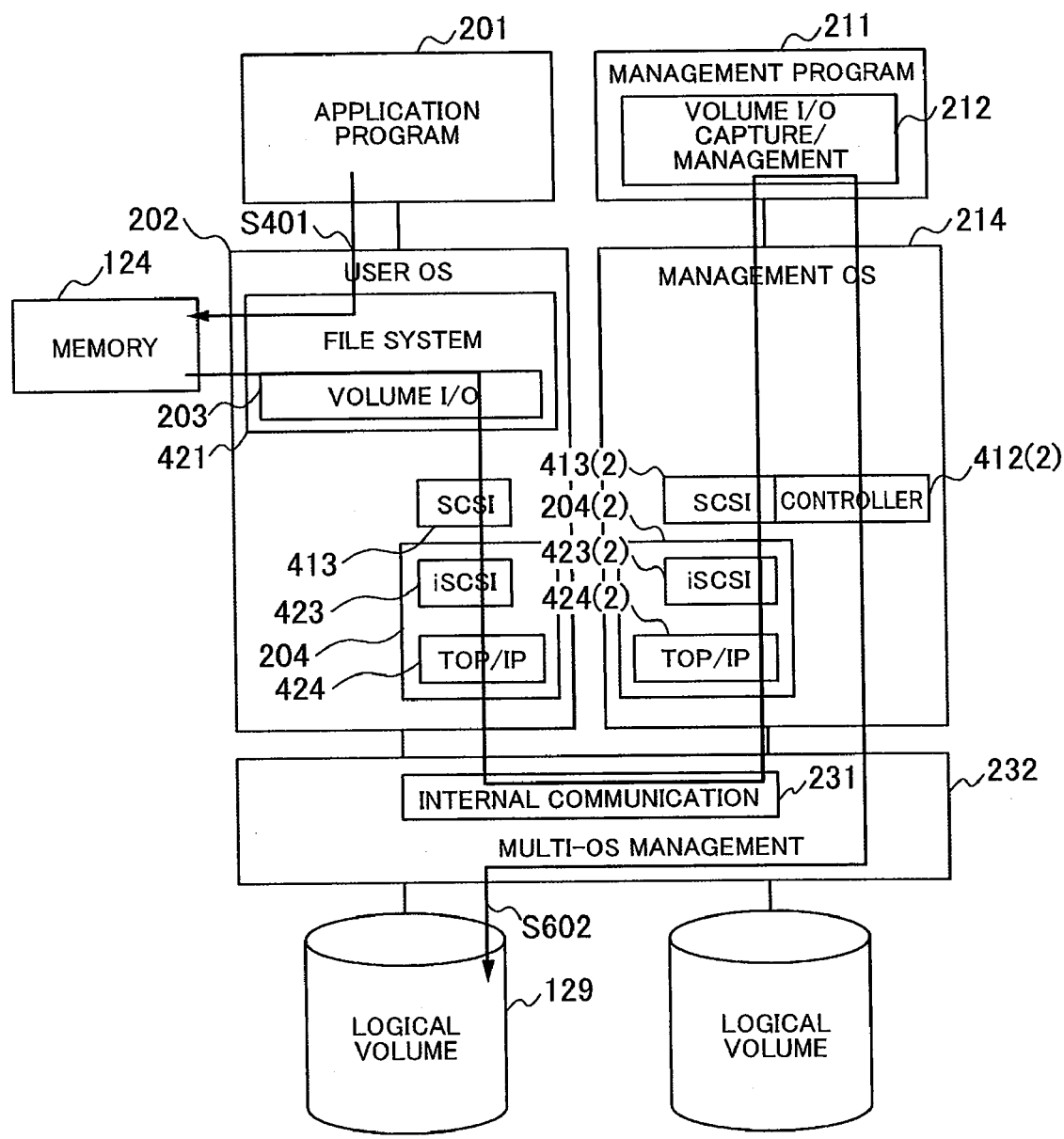
FIG. 6 is an explanatory diagram in a case of acquiring the volume I/O on the side of the management OS according to processing that is different from FIG. 5.

With reference to FIG. 4 to FIG. 6, processing for the management OS 214 to acquire the access (data reading or data writing) by the user OS 202 to the logical volume 129 allocated to the user OS 202 is now explained.

FIG. 4 shows a case where the user OS 202 is accessing the logical volume 129 without going through the management OS 214.

Application programs 201 such as the text editing program of the user OS 202 use the operation and access function to data provided from the file system function 421 in file units, and perform operations such as reading the data into the memory 124 in file units (S401).

The volume I/O function 203 of the user OS 202 performs operations such as reading data from the logical volume 129 into the memory 124 and writing data from the memory 124 into the logical volume 129 through the controller function 412 (S402).

The volume I/O function 203, for example, is provided in the file system function 421, and is a function for accessing the logical volumes 129 according to a fixed size arrangement.

The controller function 412 is a function for enabling the volume I/O function 203 to access the logical volume 129. The controller function 412 may also be of a function that is similar to a SCSI (Small Computer System Interface) function 413.

When access (S402) is made from the volume I/O function 203 to the logical volume 129, the filtering function 431 positioned between the volume I/O function 203 and the controller function 412 acquires the access, and transfers the copying of read data and write data to the volume I/O capture/management function 212 provided in the management program 211 of the management OS 214.

The read data and write data copied with the filtering function 431 are transferred to the volume I/O capture/management function 212 via the respective functions in the order of the SCSI function 413 and the communication function 204 (iSCSI (Internet Small Computer System Interface) function 423 and a lower layer TCP (Transmission Control Protocol)/IP (Internet Protocol) function 424) of the user OS 202, the internal communication function 231 of the multi-OS management function 232, the communication function 204(2) (TCP/IP function 424(2) and the lower layer iSCSI function 423(2)) and the SCSI function 413(2) of the management OS 214 (S403A).

Alternatively, the read data and write data copied with the filtering function 431 are transferred to the volume I/O capture/management function 212 through an interface other than SCSI via the respective functions in the order of the TCP/IP function 424 of the user OS 202, the internal communication function 231 of the multi-OS management function 232, and the TCP/IP function 424(2) of the management OS 214.

FIG. 5 and FIG. 6 explain a case where the user OS 202 accesses the logical volumes 129 via the management OS 214.

As illustrated in FIG. 5, the volume I/O function 203 of the user OS 202 accesses the logical volumes 129 by going through the respective functions in the order of the SCSI function 413 and the communication function 204 (iSCSI (Internet Small Computer System Interface) function 423 and a lower layer TCP/IP function 424) of the user OS 202, the internal communication function 231 of the multi-OS management function 232, the communication function 204(2)

(TCP/IP function 424(2) and the lower layer iSCSI function 423(2)), the SCSI function 413(2) and the controller function 412(2) of the management OS 214 (S502).

When access (S502) is made from the volume I/O function 203 to the logical volume 129, the lower layer filtering function 534 of the TCP/IP function 424 acquires the IP-format access, and transfers the copying of read data and write data to the volume I/O capture/management function 212 provided in the management program 211 of the management OS 214.

The read data and write data copied by the filtering function 534 are transferred to the volume I/O capture/management function 212 via the respective functions of the TCP/IP function 424(2), the iSCSI function 423(2), and the SCSI function 413(2) (S503A).

Alternatively, when access (S502) is made from the volume I/O function 203 to the logical volume 129, the filtering function 533 arranged between the TCP/IP function 424(2) and the iSCSI function 423(2) acquires the iSCSI-format access, and transfers the copying of read data and write data to the volume I/O capture/management function 212 provided in the management program 211 of the management OS 214.

The read data and write data copied by the filtering function 533 are transferred to the volume I/O capture/management function 212 via the respective functions of the iSCSI function 423(2) and the SCSI function 413(2) (S503B).

Alternatively, when access (S502) is made from the volume I/O function 203 to the logical volume 129, the filtering function 532 positioned between the iSCSI function 423(2) and the SCSI function 413(2) acquires the SCSI-format access, and transfers the copying of read data and write data to the volume I/O capture/management function 212 provided in the management program 211 of the management OS 214.

The read data and write data copied by the filtering function 532 are transferred to the volume I/O capture/management function 212 via the SCSI function 413(2) (S503C).

Alternatively, when access (S502) is made from the volume I/O function 203 to the logical volume 129, the upper layer filtering function 531 of the SCSI function 413(2) acquires the access, and transfers the copying of read data and write data to the volume I/O capture/management function 212 provided in the management program 211 of the management OS 214 (S503D).

Alternatively, as shown in FIG. 6, the volume I/O capture/management function 212 may comprise the filtering function. In other words, the volume I/O function 203 of the user OS 202 may access the logical volumes 129 via the SCSI function 413 and the communication function 204 (iSCSI (Internet Small Computer System Interface) function 423 and a lower layer TCP/IP function 424) of the user OS 202, the internal communication function 231 of the multi-OS management function 232, the communication function 204(2) (TCP/IP function 424(2) and the lower layer iSCSI function 423(2)) and the SCSI function 413(2) of the management OS 214, and additionally going through the volume I/O capture/management function 212 and the controller function 412(2) (S602).

Figure 7:
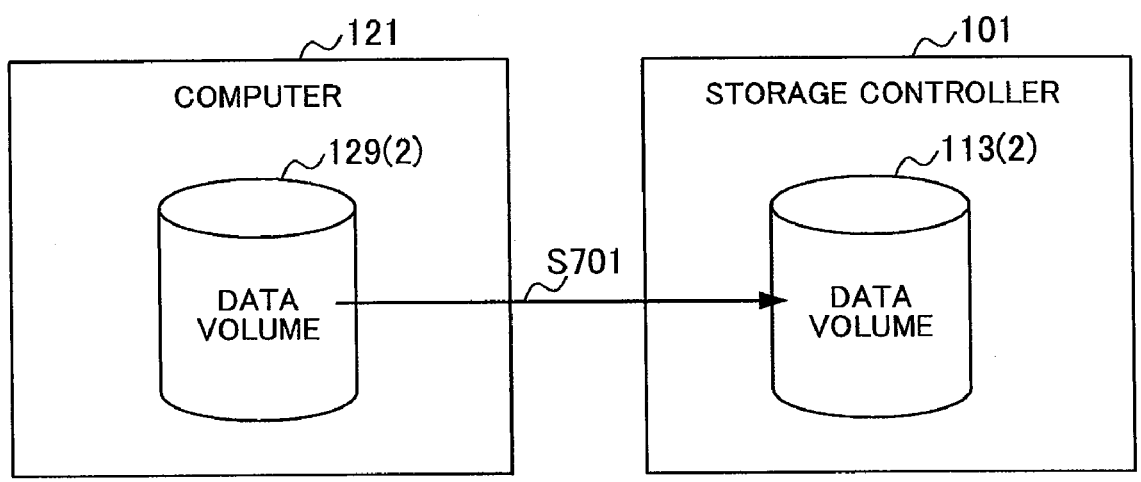
FIG. 7 is an explanatory diagram of data volume management and a remote copy system.
Figure 7:
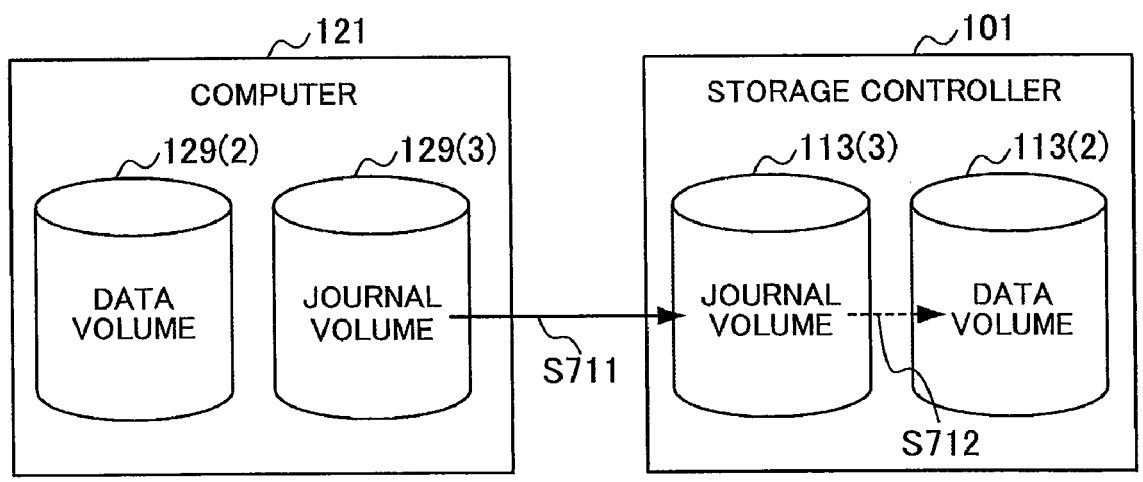

The method of managing the update of the logical volume 129 based on the access of the volume I/O function 203 and the method of reflecting the update of the logical volume 129 to the logical volume 113 of the storage controller 101 are now explained with reference to FIG. 7. The logical volumes 129 in the computer 121 can be classified into a data volume 129(2) storing application programs 201 and user data to be used by the applications, and a journal volume 129(3) storing journal data.

As explained with reference to FIG. 4 to FIG. 6, the logical volume 129 to be accessed by the volume I/O function 203 for data reading or data writing correspond to the data volume 129(2). The data volume 129(2) is therefore allocated to the user OS 202.

Journal data is data to be created by associating a sequence number (management number) to the write data, and is used as a means for managing the write data acquired by the volume I/O capture/management function 212. The journal volumes 129(3) storing journal data are therefore allocated to the management OS 214.

One method of managing the update of the data volume 129(2) is the method of directly managing the data volume 129(2). A differential bitmap table (explained later) corresponding to the write data of the data volume 129(2) is used for managing the update of the data volume 129(2).

With this update management method, the data volume 113(2) as the logical volume 113 in the storage controller 101 is set as the opponent of remote copy to the data volume 129(2), and remote copy is executed thereby (S701). The data volume 113(2) thereby directly reflects the created update to the data volume 113(2). Details of this method will be explained later with reference to FIG. 8 to FIG. 14.

Another method of managing the update of the data volume 129(2) is the method of indirectly managing the update created in the data volume 129(2) by managing the access to the data volume 129(2). The journal volume 129(3) is used for managing the access to the data volume 129(2).

In this update management method, the journal volume 113(3) as the logical volume 113 in the storage controller 101 is set as the paired volume in its remote copy relative to the journal volume 129(3), and then remote copy is executed (S711).

The journal data stored in the journal volume 129(3) is reflected in the journal volume 113(3) as a result of executing remote copy. The journal data copied to the journal volume 113(3) is subsequently applied to the data volume 113(2) (S712). The update of the data volume 129(2) is thereby indirectly reflected in the data volume 113(2). Details of this method will be explained later with reference to FIG. 15 to FIG. 17.

Alternatively, the journal data may be stored in the memory 124 in the computer 121. In other words, instead of allocating the journal volume 129(3) to the logical volume 129, the virtual journal volume 129(3) may be created in the memory 124. Although a case where the journal volume 129(3) is allocated to the logical volume 129 is explained in the ensuing explanation, this may be substituted with the virtual journal volume 129(3) formed in the memory 124, and a similar effect can also be obtained in the foregoing case, and the same applies to the journal volume 113(3) in the storage controller 101.

The update management method of the data volume 129(2) using the differential bitmap table 801 and the remote copy method to the data volume 113(2) in the storage controller 101 are now explained with reference to FIG. 8 to FIG. 14.

Figures 8, 9, 10:
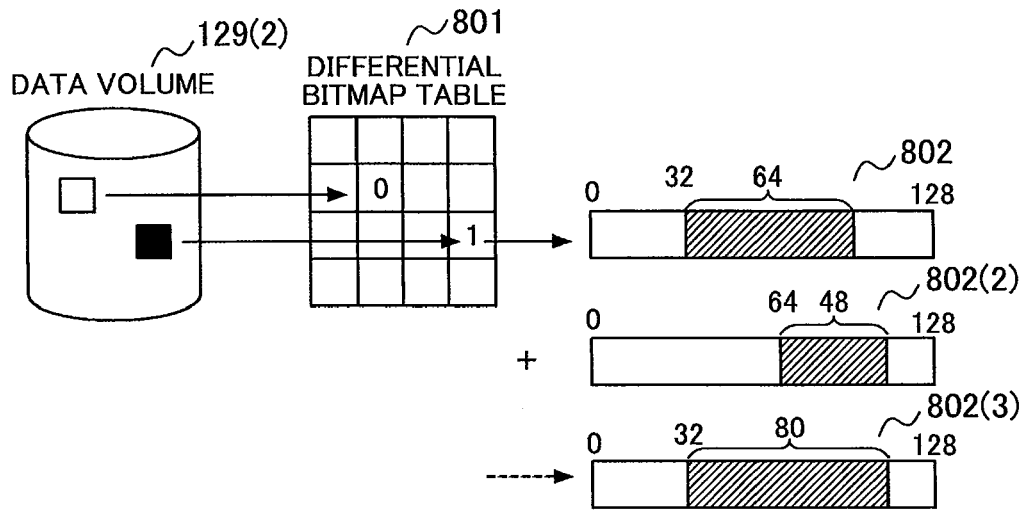
FIG. 8 is a schematic explanatory diagram of data volume update management using a bitmap.
FIG. 9 is an explanatory diagram of a block area management table.
FIG. 10 is an explanatory diagram of a write data management table.

FIG. 8 is a schematic diagram showing the update management method of the data volume 129(2) using the differential bitmap table 801, and FIG. 9 is an explanatory diagram of a management table of the block areas obtained by partitioning the area of the data volume 129(2). The block area management table is one implementation example of the differential bitmap table 801. FIG. 10 is an illustration of the write data management table when partitioning the block areas into smaller blocks and managing the write area.

The differential bitmap table 801 includes bit information 902 corresponding to each of the plurality of block areas (for example, the size of one block area is 64 K bytes) in the data volume 129(2). The bit information 902 is set with either "0" or "1."

When the bit information 902 is "0," this represents that the data of the block area of the data volume 129(2) and the data of the block area of the data volume 113(2) in the storage controller 101 corresponding to the foregoing block are the same. When the bit information 902 is "1," this represents that there is a difference between the data of the block area of the data volume 129(2) and the data of the block area of the data volume 113(2) in the storage controller 101 corresponding to the foregoing block.

Accordingly, when the bit information 902 of the differential bitmap table 801 is all "0," this represents that the data volume 129(2) and the data volume 113(2) are completely in sync.

When the differential bitmap table 801 contains bit information 902 of "1," this represents a status where one or more block areas of the data volume 129(2) are updated based on the data writing from the volume I/O function 203, and there is a difference with the data volume 113(2).

FIG. 9 is an explanatory diagram of the block area management table as one implementation example of the differential bitmap table 801 of the data volume 129(2). The block area management table, for example, can be stored in the memory 124 of the computer 121, or retained in an area of any one of the logical volumes 129.

The block area management table includes a block ID 901 as a unique identification number of the block area, bit information 902 registering bit information of the block area, a block update time 903 registering the update time based on the data writing of the block area, a copy start time 904 registering the copy start time of the block area, a copy end time 905 registering the copy end time of the block area, a write data management information address 906 registering the storage position of the write data management information 802 associated with the block area, and so on.

In each of the block update time 903, the copy start time 904, and the copy end time 905, the counter value obtained by using the TPM (Trusted Plafform Module) or the like of the computer 121 in substitute for the foregoing time may also be registered.

The write data management information 802 is information for managing the update area of the data volume 129(2) in a block area (for example, 512 bytes) that is smaller than the foregoing block area. The write data management table having the list structure as shown in FIG. 10 is used for this management.

The write data management table is configured from a VOL-ID 301(2) registering the ID of the data volume 129(1) to which write data is written, a block ID 901(2) registering the ID of the block area to which write data is written, a bit position 1001 showing the position of bits in the differential bitmap table 801, a subsequent write data management information address 906(2) showing the storage position of the write data management information to be associated subsequently, a top address 1003 representing the top position of the small block area to which write data in the block area is written, and an area length 1004 representing the size of the small block area from the top address 1003.

The write data management table, for example, may also be stored in the memory 124 of the computer 121, or retained in an area of any one of the logical volumes 129.

Figure 11:
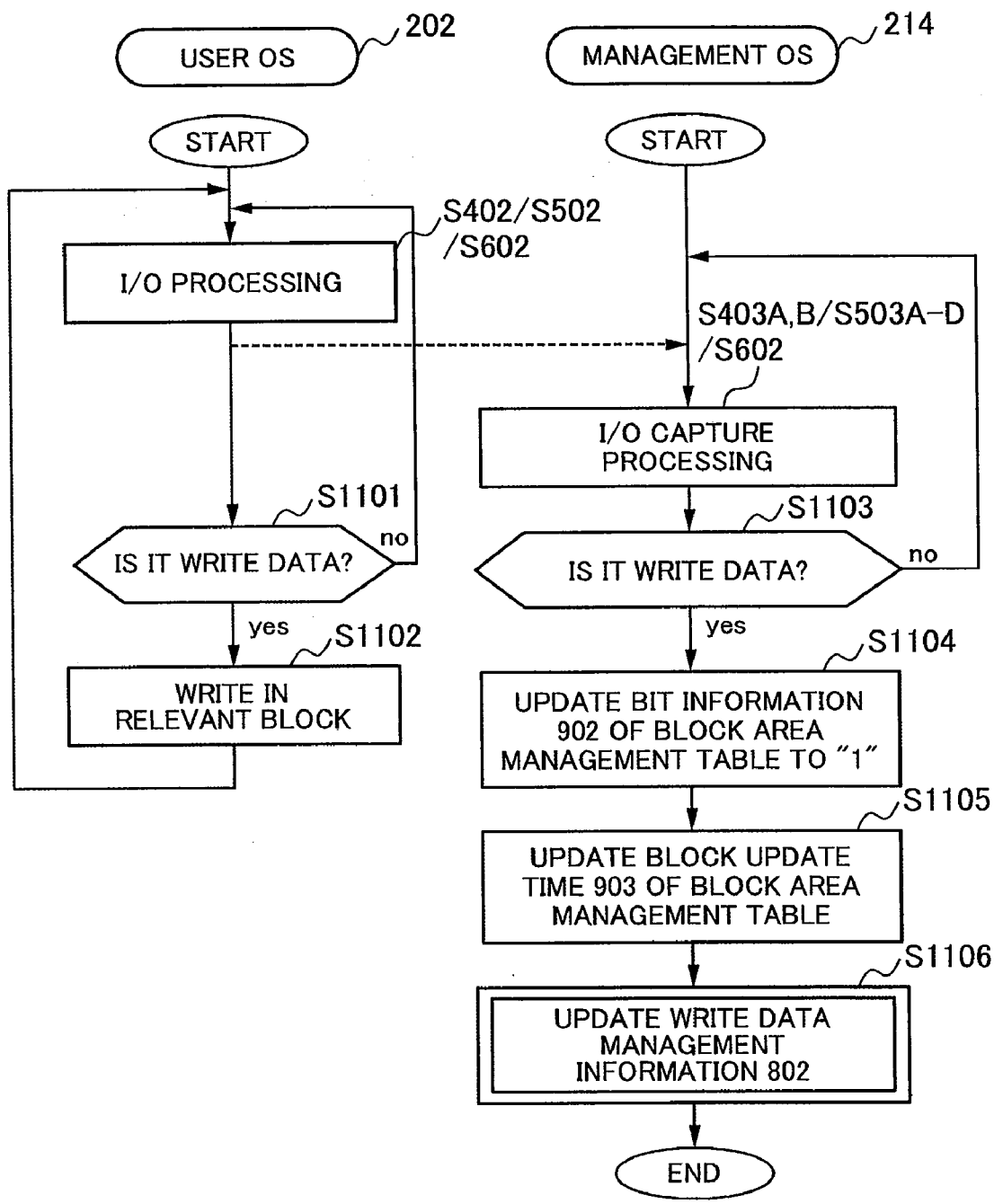
FIG. 11 is a flowchart showing update management processing of data volumes using a bitmap.

FIG. 11 is a diagram showing the flow of update management of the data volume 129(2) using the differential bitmap table 801.

The user OS 202 executes the access (data reading or data writing) from the volume I/O function 203 to the data volume 129(2) as explained in FIG. 4 to FIG. 6 (S402/S502/S602).

When the contents of the access to the data volume 129(2) is confirmed (S1101) and such contents are write data, data is written into the block area of the data volume 129(2) (S1102).

Meanwhile, the management OS 214 manages the update status of the data volume 129(2) in correspondence to the writing of data into the data volume 129(2) of the user OS 202.

The volume I/O capture/management function 212 acquires the access from the volume I/O function 203 to the data volume 129(2) as explained in FIG. 4 to FIG. 6 (S403A/S403B/S503A/S503B/S503C/S503D/S602).

The volume I/O capture/management function 212 confirms the contents of the acquired access (S1103), and, when such contents are write data, it sets the bit information 902 corresponding to the write block area of the data volume 129(2) to "1" in the block area management table shown in FIG. 9 (S1104).

The volume I/O capture/management function 212 registers the time that the block area to which the data is written was updated in the block update time 903 (S1105).

Subsequently, the volume I/O capture/management function 212 updates the write data management information 802 for managing the write data written into the block area in a smaller area (S1106). The processing at S1106 corresponds to the processing from S1201 to S1210 of FIG. 12.

Figure 12:
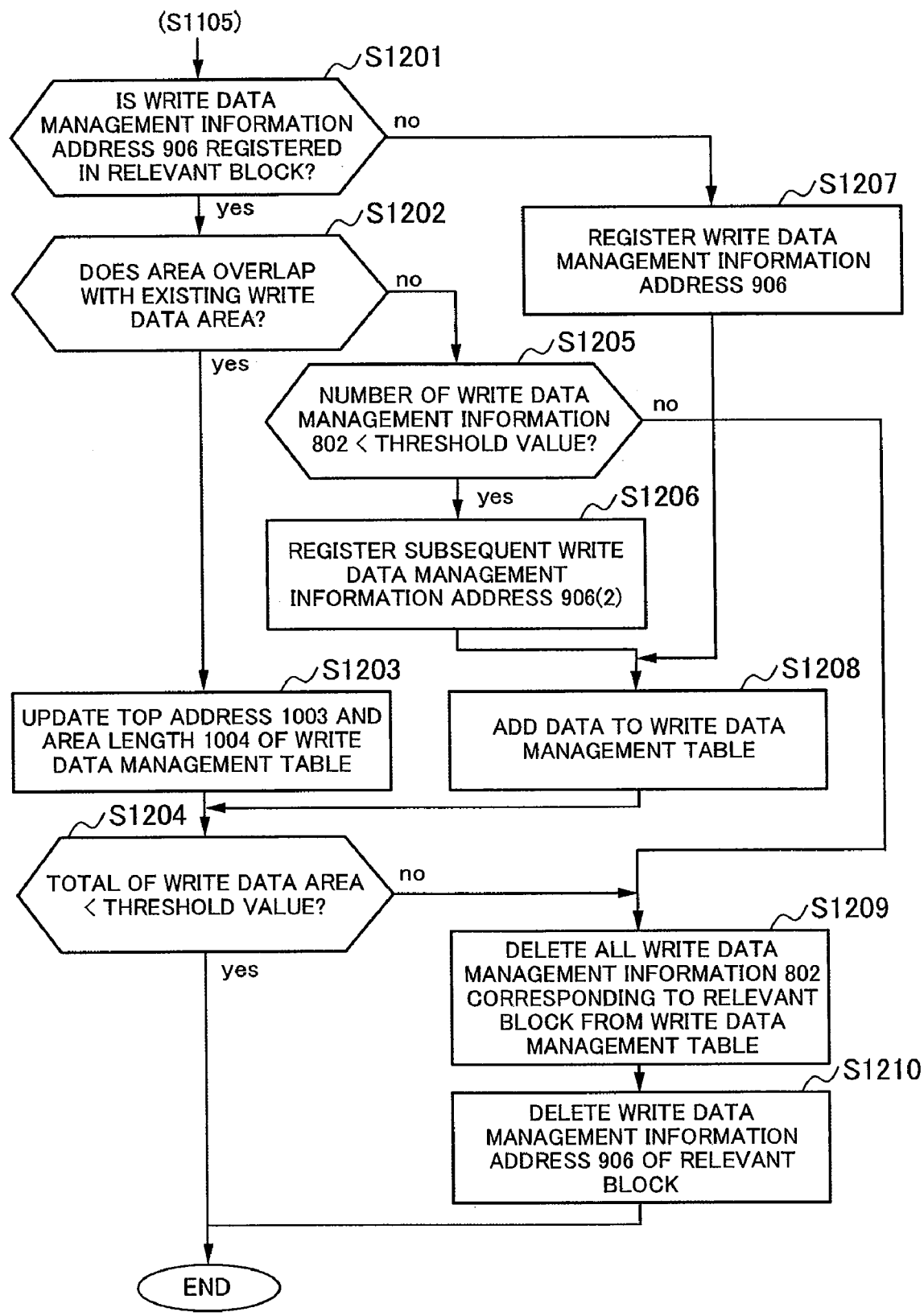
FIG. 12 is a flowchart showing update processing of write data management information.

The update processing of the write data management information 802 to be executed by the volume I/O capture/management function 212 is now explained with reference to FIG. 12.

In order to confirm whether the write data management information 802 is associated with the block area, the value of the write data management information address 906 in the block area management table shown in FIG. 9 is referred to (S1201).

If the write data management information address 906 is not registered in the block area management table, a storage area of the write data management information 802 is newly created, and an address showing that position is registered in the write data management address 906 of the block area management table (S1207).

The respective data of the foregoing VOL-ID 301(2), block ID 901(2), bit position 1001, top address 1003, and area length 1004 are registered in the newly created storage area of the write data management information 802 (S1208). At this point, the subsequent write data management information address 906(2) is left as a blank column.

If the write data management information address information 906 is registered in the block area management table, the write data management information 802 of the write data management table is searched based on such address. Whether the existing write data area overlaps with the newly written data area is checked based on the top address 1003 and the area length 1004 of the searched write data management information 802 (S1202).

When the existing write data area overlaps with the newly written data area, the write data areas are combined, and the top address 1003 and the area length 1004 of the previously registered write data management information 802 are updated (S1203).

For example, as illustrated in FIG. 8, in a status where the write data management information 802 (top address 1003=32, area length 1004=64) is registered in relation to the block area, if write data corresponding to the write data management information 802(2) (top address 1003=64, area length 1004=48) is newly created in relation to the block area, the write data management information 802(2) (top address 1003=64, area length 1004=48) is combined with the write data management information 802 (top address 1003=32, area length 1004=64), and the top address 1003 and the area length 1004 of the write data management information 802 are updated to 32 and 80 (802(3)), respectively.

When the existing write data area does not overlap with the newly written data area, whether the number of write data management information 802 associated with the block area is lower than the predetermined threshold value is checked (S1205).

If the number is lower than the threshold value, a storage area of the write data management information 802 is newly created, the address showing that position is registered in the subsequent write data management information address 906 (2) column of the existing write data management information 802 (S1206), and the routine proceeds to S1208.

As a result of S1203 or S1208, whether the total value of the area 1004 regarding one or more write data management information 802 associated with the block area is lower than the predetermined threshold value is determined (S1204). If the total value is lower than the threshold value, one or more write data management information 802 is left registered in relation to the block area.

If the total value of the area 1004 regarding one or more write data management information 802 associated with the block area is greater than the predetermined threshold value at S1204, or if the number of write data management information 802 associated with the block area is greater than the predetermined threshold value at S1205, all write data management information 802 associated with the block area is deleted from the write data management table (S1209).

The write data management information address 906 corresponding to the block area is also deleted from the block area management table (S1210).

Figure 13:
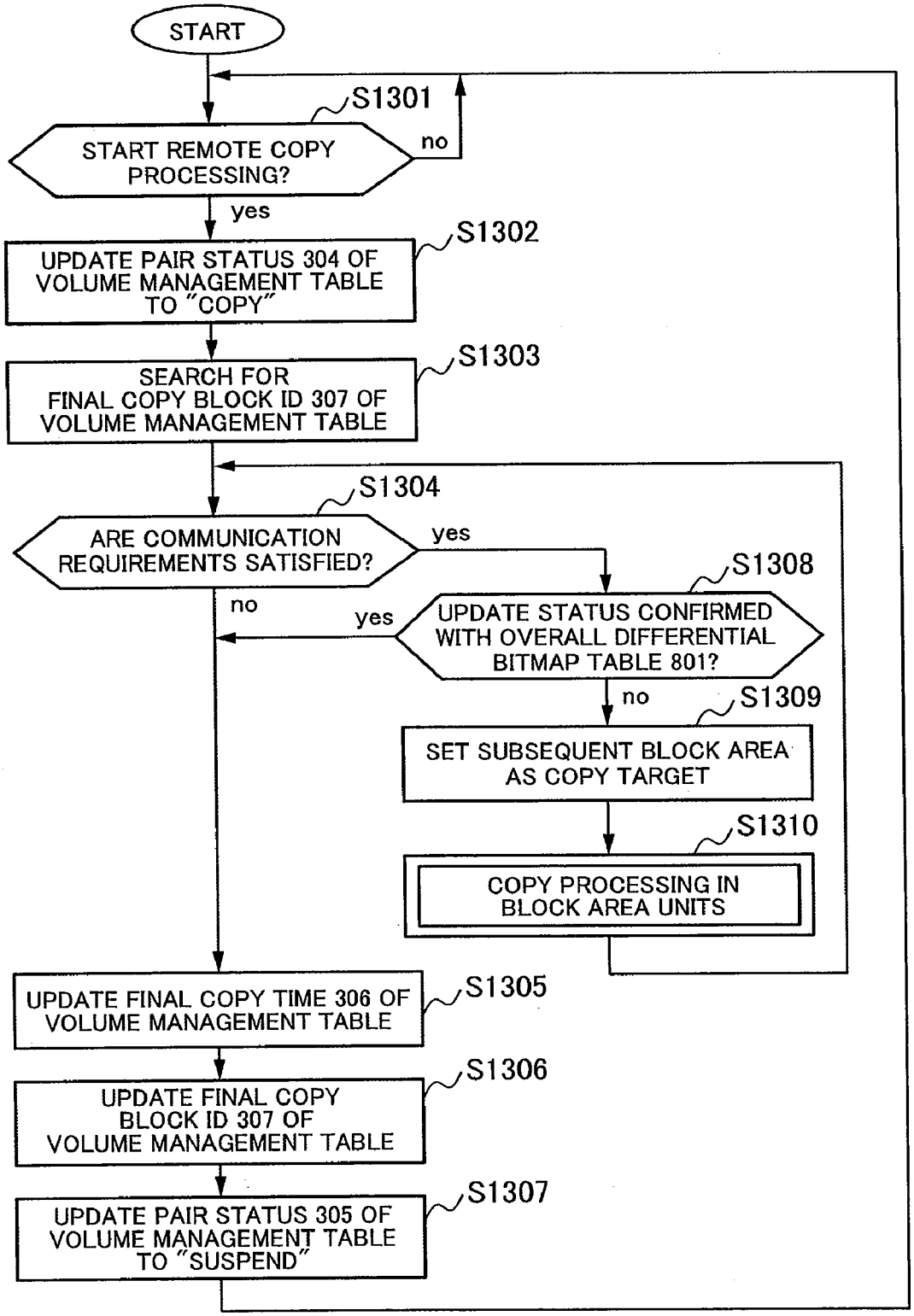
FIG. 13 is a flowchart showing remote copy processing using a bitmap.

The processing of reflecting the update created in the data volume 129(2) with the remote copy function 213 of the computer 121 in the data volume 113(2) of the storage controller 101 is now explained with reference to FIG. 13 and FIG. 14.

The remote copy function 213 of the computer 121 is operated independent from the volume I/O capture/management function 212. When the start-up of remote copy processing is requested, remote copy processing is executed (S1301). The trigger to start remote copy processing will be explained later.

The trigger to start the processing of the remote copy function 213 is based on the processing in the computer 121 as explained later, and this is independent from the processing of the storage controller 101.

Alternatively, the start-up of the remote copy function 213 may be executed by being triggered based on a request from the storage controller 101. The post-start-up processing in the foregoing case is exactly the same as the case of starting up the remote copy function 213 independently from the processing of the storage controller 101 based on the processing in the computer 121.

Data of the data volume 129(2) is retrieved from the volume area management table, and then the pair status 304 is updated to COPY (S1302).

Data of the data volume 129(2) is retrieved from the volume area management table, and then the final copy block ID 307 is acquired in order to confirm the final block area to which copy processing was performed (S1303).

Whether the communication status between the computer 121 and the storage controller 101 satisfies the communication requirements is confirmed (S1304). The method of confirming the communication requirements will be explained later.

If the communication requirements are satisfied, whether the update status (bit information 902 in the block area management table) in all block areas of the differential bitmap table 801 (or the block area management table as one implementation example thereof) has been confirmed since the remote copy processing was started based on one trigger is determined (S1308).

If there is a block area in which the update status has not been confirmed, the subsequent block area is set as the copy target (S1309), and the copy processing in block area units is performed (S1310).

If the communication requirements are not satisfied, or the update status of all block areas of the differential bitmap table 801 has been confirmed since the remote copy processing was started based on one trigger and there are no block areas in which the update status has not been confirmed, the remote copy processing started based on the foregoing trigger is ended.

When the remote copy processing is ended, the final copy time 306 of the data volume 129(2) in the volume area management table is updated (S1305). In The final copy time 306, the time in which the copy processing (S1310) in block area units was ended is registered.

The final copy block ID 307 of the data volume 129(2) in the volume area management table is also updated (S1306). In the final copy block ID 307, the ID of the block area in which the copy processing (S1310) in block area units has ended is registered.

The pair status 304 of the data volume 129(2) in the volume management table is updated to SUSPEND (S1307), and the processing returns to S1301 once again.

The copy processing (S1310) in block area units is now explained with reference to FIG. 14. The copy processing (S1310) in block area units corresponds to the processing from S1401 to S1413 of FIG. 14.

If the communication requirements between the computer 121 and the storage controller 101 are satisfied, and there is a block area in the differential bitmap table 801 in which the update is unconfirmed since the remote copy processing was started based on one trigger, the subsequent block area is set as the copy target (S1309), and copy processing is performed in block units.

Whether the bit information 902 of the block area management table is "0" or "1" is confirmed (S1401). If it is "0," there is no need to perform remote copy since data writing has not occurred in the block area from a status of being in sync with the block area to become the copy pair. Thus, the routine returns to S1304.

If the bit information 902 of the block area management table is "1," remote copy processing is executed and the update is reflected in the block area to become the copy pair since data writing has occurred in the block area from a status of being in sync with the block area to become the copy pair. Foremost, the current time is registered in the copy start time 904 of the block area management table (S1402).

The write data management information address 906 of the block area management table is referred to in order to confirm whether the write data management information 802 is associated with the block area (S1403).

If the write data management information address 906 is not registered, remote copy processing is executed in block area units to the blocks of the data volume 113(2) in the storage controller 1101 to become the copy pair (S1404).

Whether the remote copy was successful is determined based on the response concerning the remote copy from the storage controller 101 (S1405). If the remote copy ends in a failure, there is a possibility that the communication status has been changed. Thus, the routine returns to S1304, and whether the communication requirements are satisfied is confirmed.

If the remote copy was successful, whether the block update time 903 of the block area management table is smaller than (before) the copy start time 904 is confirmed (S1406).

If the block update time 903 is greater than the copy start time 904 (i.e., is recent), since this shows that the block area has been updated by the volume I/O function 203 during the remote copy of the block area (i.e., data has been written after the copy start time), the routine returns to the processing at S1402 for performing remote copy processing to the block area once again.

If the block update time 903 is smaller than (before) the copy start time 904, this means that the block area has been updated during the remote copy of the block area. Under these conditions, since the update (data writing) occurring to the block has been reflected in the block area of the data volume 131(2) to become the copy pair, and the difference between the block area and the block area forming a copy pair therewith has been eliminated, the copy end time 905 of the foregoing block of the block area management table is updated (S1412), and the bit information 902 is updated to "0" (S1413).

If the write data management information address 906 is registered at S1403, since this means that the write data area of the block is being managed in small blocks, the write data management information address 906 is referred to in order to search for the write data management information 802 of the write data management table (S1407).

Remote copy processing is performed to the small block areas based on information such as the top address 1003 and the area length 1004 of the write data management information 802 (S1408).

Subsequently, the same processing and determination as S1405 are executed (S1409).

The same processing and determination as S1406 are thereafter executed (S1410).

If the block update time 903 is smaller than the copy start time 904 (i.e., is recent), this means that the block area has not been updated during the remote copy of the small block area. Under these conditions, since the update (data writing) that occurred in the small block is reflected in the block area of the data volume 131(2) to become a copy pair, the subsequent write data management address 906(2) of the write data management information 802 in the write data management table is referred to in order to confirm whether the write data management information 802 is registered. If the subsequent write data management address 906(2) is registered, the routine returns to S1407, and processing from S1407 is performed to the write data management information 802 that is designated by that address.

If the subsequent write data management address 906(2) is not registered, since this means that the update (data writing) that occurred in the block is reflected in the block area of the data volume 131(2) to become a copy pair, and the difference between that block area and the block area to form a copy pair therewith has been eliminated, the processing at S1412 and S1413 is executed.

Figure 14:
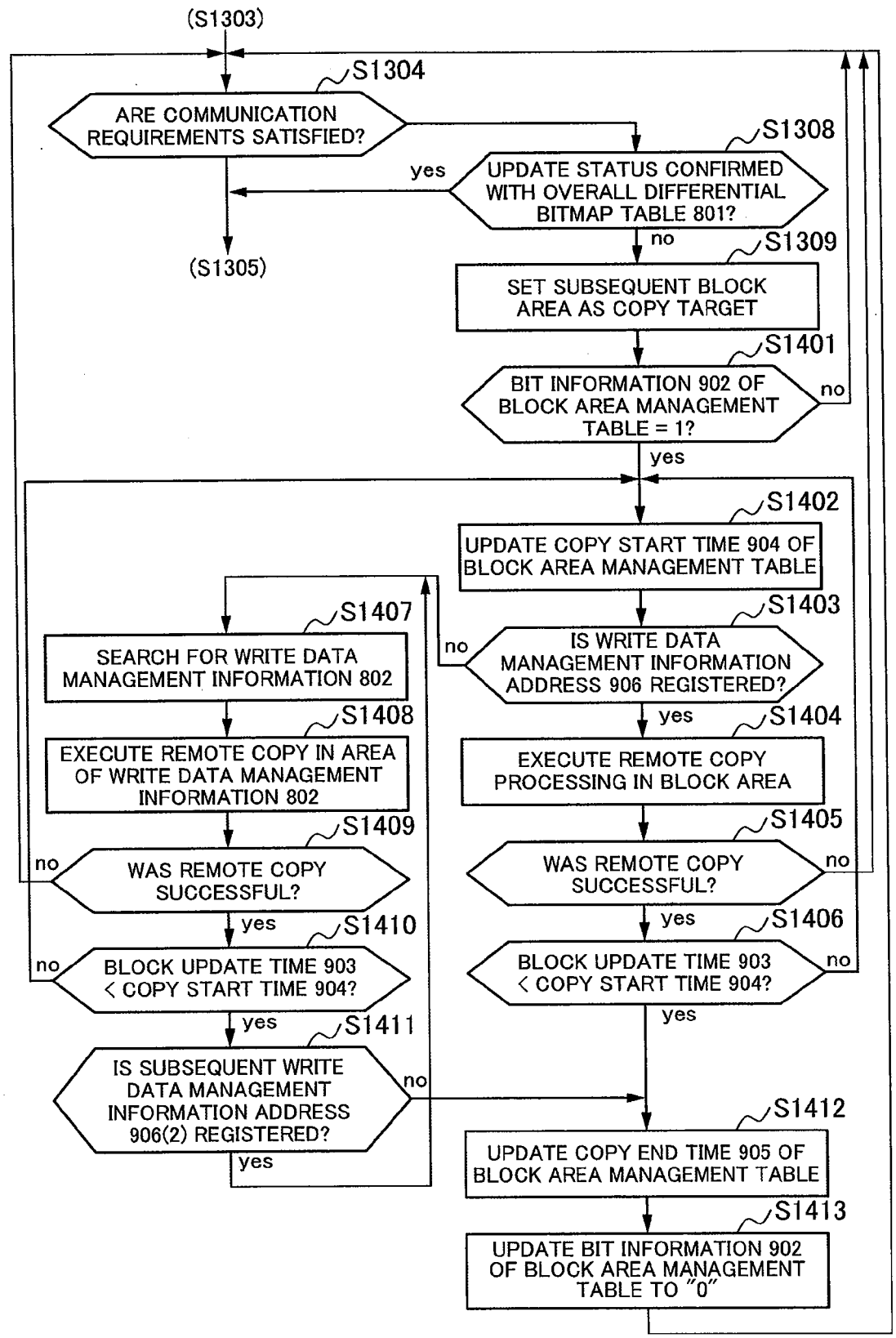
FIG. 14 is a flowchart showing remote copy processing in block area units.

With the remote copy in block area units illustrated in FIG. 14, the communication status is confirmed each time the remote copy of the block area is executed. If the communication between the computer 121 and the storage controller 101 is disrupted, since the final copy time 306 and the final copy block ID 307 at that point in time are retained in the volume management table, it is possible to resume remote copy from the copy status at the time of communication disruption when communication is recovered.

With the update management of the data volume 129(2) and the remote copy to the data volume 131(2) to be executed by the volume I/O capture/management function 212 explained above, efficient management is realized by performing management in small block area units if the size of the write data area in the respective block areas is smaller than the threshold value, or when the number of write data management information 802 managing the write data area is lower than the threshold value, and performing management in block area units in all other situations.

In this management method, it is also possible to switch the update management unit of the data volume 129(2) according to the connection status of the computer 121 and the communication network 131 (communication status between the computer 121 and the storage controller 101).

For example, it is assumed that the data volume 129(2) of the computer 121 and the data volume 113(2) of the storage controller 101 are synched in advance.

If the computer 121 is in a communicable status with the storage controller 101, the update (data writing) that occurred in the data volume 129(2) can be reflected in the data volume 131(2) after a relatively short period of time from the occurrence of such data writing based on remote copy processing.

As described above, since the difference with the data volume 131(2) that occurred to the data volume 129(2) can be eliminated after a relatively short period of time if the computer 121 is in a communicable status with the storage controller 101, it is unlikely that this difference will be accumulated in the area and grow larger. Thus, it would be better that the management area is smaller.

Accordingly, if the computer 121 is in a communicable status with the storage controller 101, it is assumed that it would be more efficient to use the write data management information 802 and perform management in small block area units.

In contrast, if the computer 121 is not in a communicable status with the storage controller 101, it is not possible to execute remote copy processing. The update (data writing) that occurred in the data volume 129(2) can only be reflected in the data volume 131(2) after communication is recovered, and this is considered to be a relatively long time after the occurrence of such data writing.

By way of this, in a state where communication is not possible, the difference with the data volume 131(2) that occurred to the data volume 129(2) will not be eliminated until communication is recovered. Thus, since it is assumed that the difference will be accumulated in the area and grow larger according to the time that communication is disrupted, the management area may be large.

Accordingly, if the computer 121 is not in a communicable status with the storage controller 101, it is assumed that it would be more efficient not to use the write data management information 802 and perform management in block area units.

In light of the above, if the computer 121 is in a communicable status with the storage controller 101, the write data management information 802 is used to manage the update created in the data volume 129(2) in small block areas. At the point in time that the communication between the computer 121 and the storage controller 101 is disrupted, the processing at S1209 and S1210 is performed in all block areas associated with the write data management information 802, and the management unit of the update created in the data volume 129(2) is switched to block area units. In addition, when communication between the computer 121 and the storage controller 101 is recovered, the processing for switching the management unit of returning to the management in small block areas is performed.

As a result of the foregoing processing, the volume I/O capture/management function 212 can realize the efficient management of the update of the data volume 129(2) according to the communication status between the computer 121 and the storage controller 101.

The update management method of the data volume 129(2) using the journal volume 129(3) and the remote copy method to the journal volume 113(3) in the storage controller 101 set as the opponent of remote copy of the journal volume 129(3) are now explained with reference to FIG. 15 to FIG. 17.

Figure 15:
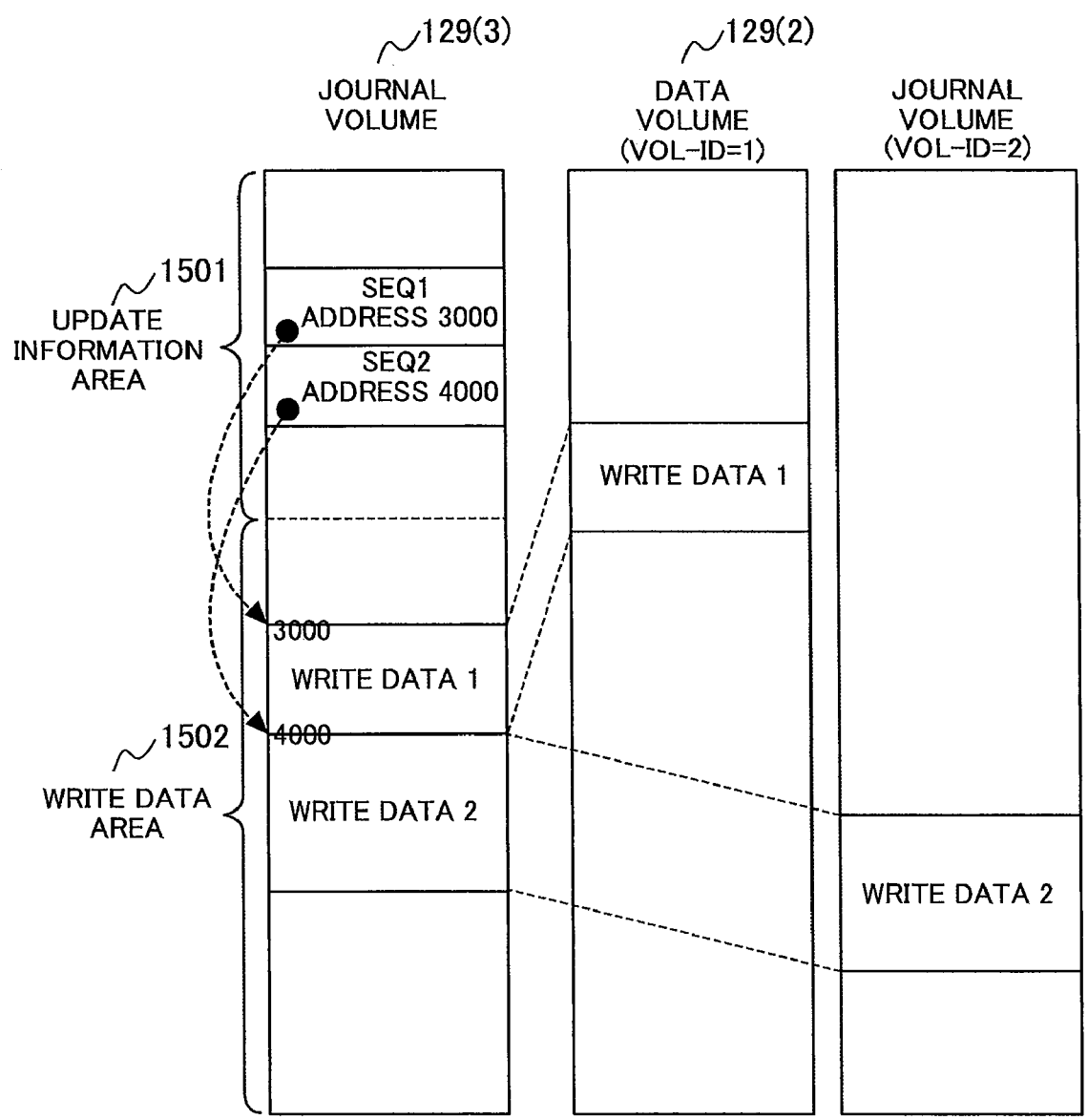
FIG. 15 is an explanatory diagram showing the relation of a data volume and a journal volume.

FIG. 15 shows the relationship of the data volume 129(2) and the journal volume 129(3).

The journal volume 129(3) manages the update (data writing) to the respective data volumes 129(2).

An update information area 1501 is provided in the top side of the storage area of the journal volume 129(3), and a write data area 1502 is provided in the storage area following the foregoing update information area.

The write data area 1502 stores the copy of the write data written into the respective data volumes 129(2). The storage destination address and the sequence number (SEQ) (management number) of the write data stored in the write data area 1502 are associated and stored in the update information area 1501.

The sequence number is a unique number that is issued each time write data is acquired based on the volume I/O capture/management function 212, and is a number that is used for managing the update order.

Figure 16:
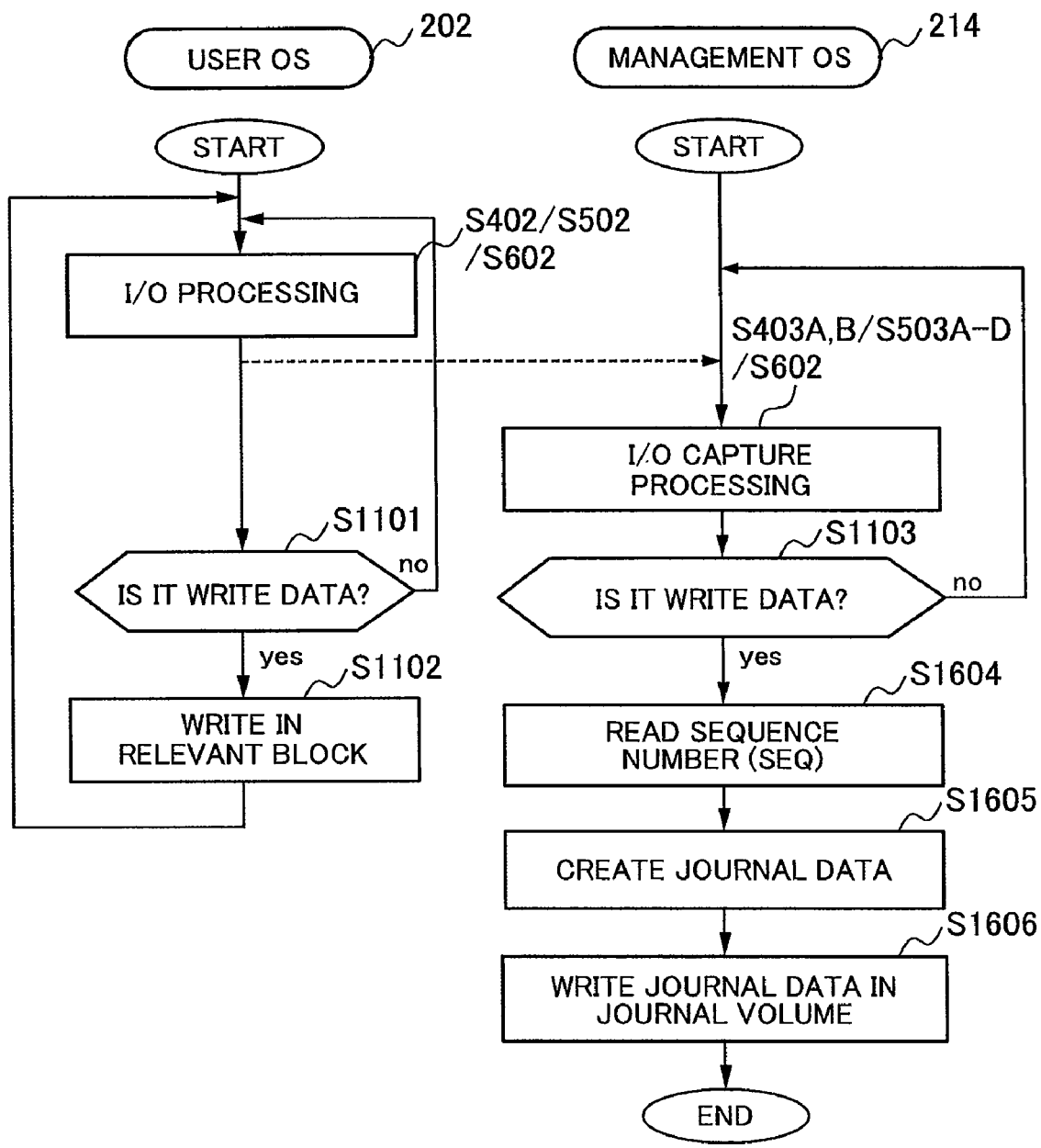
FIG. 16 is a flowchart showing update management processing of data volumes using a journal volume.
Figure 17:
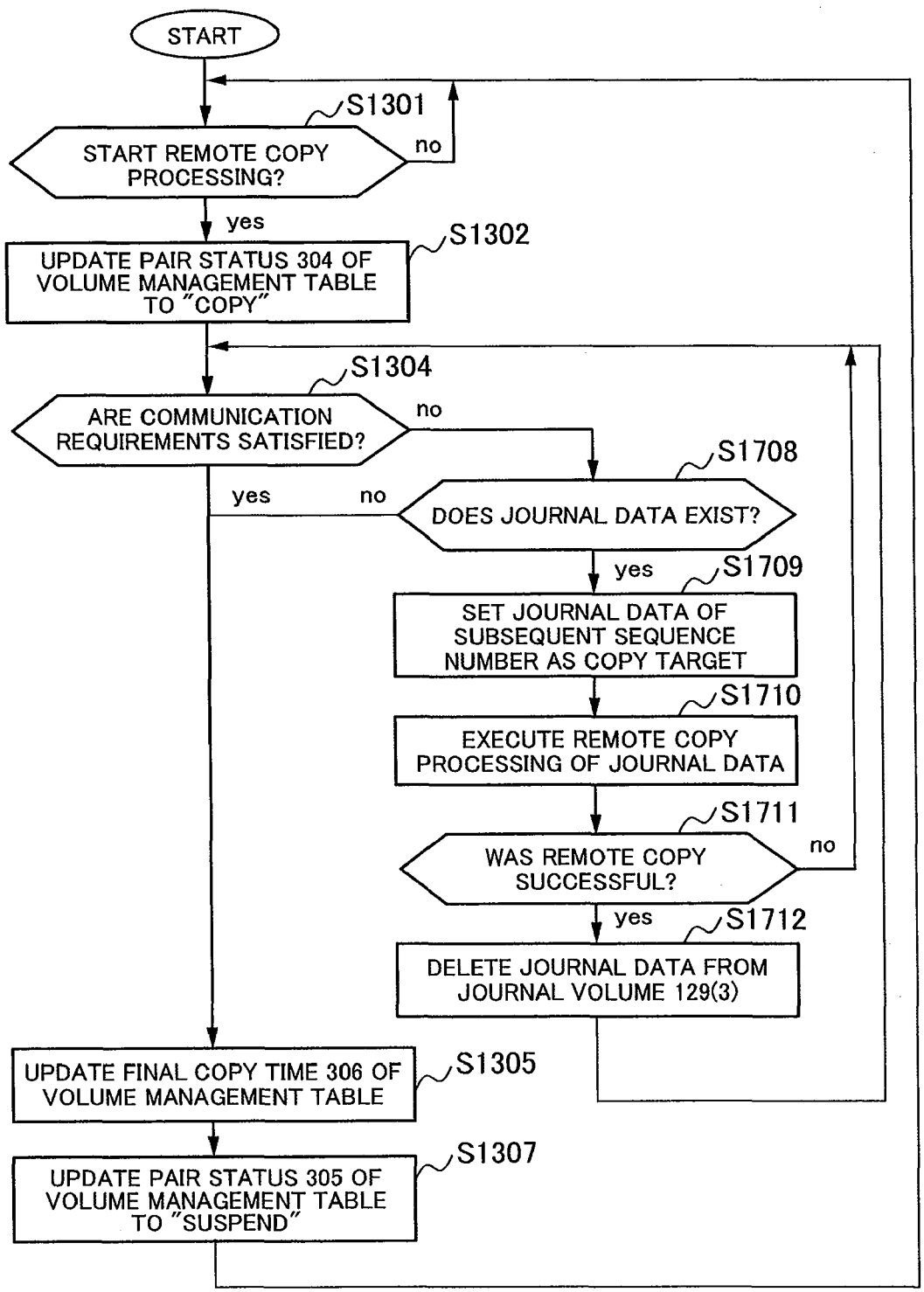
FIG. 17 is a flowchart showing remote copy processing of a journal volume.

FIG. 16 shows the flow of update management of the data volume 129(2) using the journal volume 129(3). This processing is similar to the flow of update management of the data volume 129(2) using the differential bitmap table 801 shown in FIG. 11, and only the processing (S1604 to S1606) that is different from FIG. 11 is explained below.

The volume I/O capture/management function 212 confirms the contents of the acquired access (S1103) and, when such contents are write data, reads a unique sequence number for managing the write data (S1604).

The volume I/O capture/management function 212 additionally associates the sequence number (management number) with the write data and creates journal data (S1605).

The volume I/O capture/management function 212 further writes the journal data in the update information area 1501 and the write data area 1502 of the journal volume 129(3) (S1606).

The flow of remote copy processing of the journal volume 129(3) is now explained with reference to FIG. 17. This processing is similar to the flow of remote copy processing of the data volume 129(2) using the differential bitmap table 801 shown in FIG. 13 and FIG. 14, and only the processing (S1708 to S1712) that is different from FIG. 13 is explained below.

The existence of journal data is confirmed in the journal volume 129(3) (S1708). As explained later, since journal data is deleted when the remote copy is successful, if journal data exists in the journal volume 129(3), it will be subject to remote copy.

If journal data does not exist, it is considered that all journal data has been transferred to the journal volume 113(3) of the storage controller 101 as the remote copy destination. In this case, the routine proceeds to S1305.

If journal data exists, journal data of the subsequent sequence number (journal data with the smallest sequence number or the oldest sequence number) is set as the remote copy target (S1709), and remote copy processing is executed thereby (S1710).

As with the processing at S1405, whether the remote copy was successful is determined based on the response concerning the remote copy from the storage controller 1101 (S1711). If the remote copy ends in a failure, as with S1405, the routine returns to S1304.

If the remote copy is successful, since this means that the update (write data) in the data volume 129(2) has been reflected in the journal volume 113(3) as the remote copy pair, the foregoing journal data is deleted from the journal volume 129(3) (S1712).

With the reflection of the update in the data volume 129(2) using the journal data to be executed by the volume I/O capture/management function 212 explained above, the order information of write data is stored and the update created in the data volume 129(2) is reflected in the data volume 113(2).

Thus, it is possible to manage the history of writing into the data volume 129(2) with the storage controller 101, and reproduce the status of the data volume 129(2) at a point in time in the past in the data volume 113(2). However, it is necessary to give consideration to the capacity to be allocated to the journal volume 129(3) for storing the journal data.

For example, if the computer 121 is in a communicable status with the storage controller 101, it is possible to transfer the journal data stored in the journal volume 129(3) in correspondence with the writing of data into the data volume 129(2) to the journal volume 131(3) after a relatively short period of time from the occurrence of such data writing.

In the foregoing case, since the journal data stored in the journal volume 129(3) is transferred to the journal volume 131(3) after a relatively short period of time and deleted when the transfer is successful, the capacity of the journal volume 129(3) can be kept relatively small.

In contrast, if communication between the computer 121 and the storage controller 101 is not possible, since the journal data is accumulated in the journal volume 129(3) according to the writing of data into the data volume 129(2), it is necessary to equip the journal volume 129(3) with sufficient capacity for storing the journal data occurring until communication is recovered.

Thus, in order to suppress the capacity to be allocated to the journal volume 129(3), the computer 121 and the communication network 131 may properly use the update management of the data volume 129(2) and the remote copy method according to the connection environment (communication environment of the computer 121 and the storage controller 101).

Although the foregoing explanation was based on the perspective of optimizing the capacity of the journal volume 129(3); that is, the perspective of optimally using the capacity of the storage device 130 in the computer 121, this may also be based on a different perspective.

In comparison to the method using the differential bitmap table 801, although the method using the journal volume 129(3) reflects the update created in the data volume 129(2), together with history information, in the data volume 131(2) as the copy pair on the one hand, it is characterized in that the transferred data volume is large since all acquired write data will be transferred. Accordingly, the update processing of the data volume 129(2) and the method of remote copy may be switched based on the perspective of the data transfer performance of the communication network 131.

If the computer 121 is installed at a location having the communication conditions as though inside a company, if it is constantly in a communicable environment with the storage controller 101, or if the band of the communication network 131 with the storage controller 101 is large and the delay is small, the journal volume 129(3) is used to reflect the update created in the data volume 129(2), together with the history information, in the data volume 131(2) as the copy pair.

If the computer 121 is carried outside to a location having the communication conditions as thought outside a company and if it is only able to communicate with the storage controller 101 intermittently, or if it is constantly in a communicable environment but the band of the communication network 131 is small and the delay is large, the differential bitmap table 801 is used to reflect the update created in the data volume 129(2) in the data volume 131(2) as the data volume 131(2).

The environment in which the computer 121 is installed can be determined based on the information of the IP address that the management OS 211 allocated to the computer 121. Further, the performance of the communication network 131 can be grasped by the management OS 211 measuring the delay time or available band in the communication path with the storage controller 101.

As described above, by way of switching the method of managing the update of the data volume 129(2) according to the connection environment to the communication network 131 of the computer 121 or the performance of the communication network 131, it is possible to suppress the capacity to be allocated to the journal volume 129(2) in the computer 121, or manage the update history of a part of the data volume 129(2) without imposing excess burden on the communication network 131, while preserving all data of the data volume 129(2).

Figure 18:
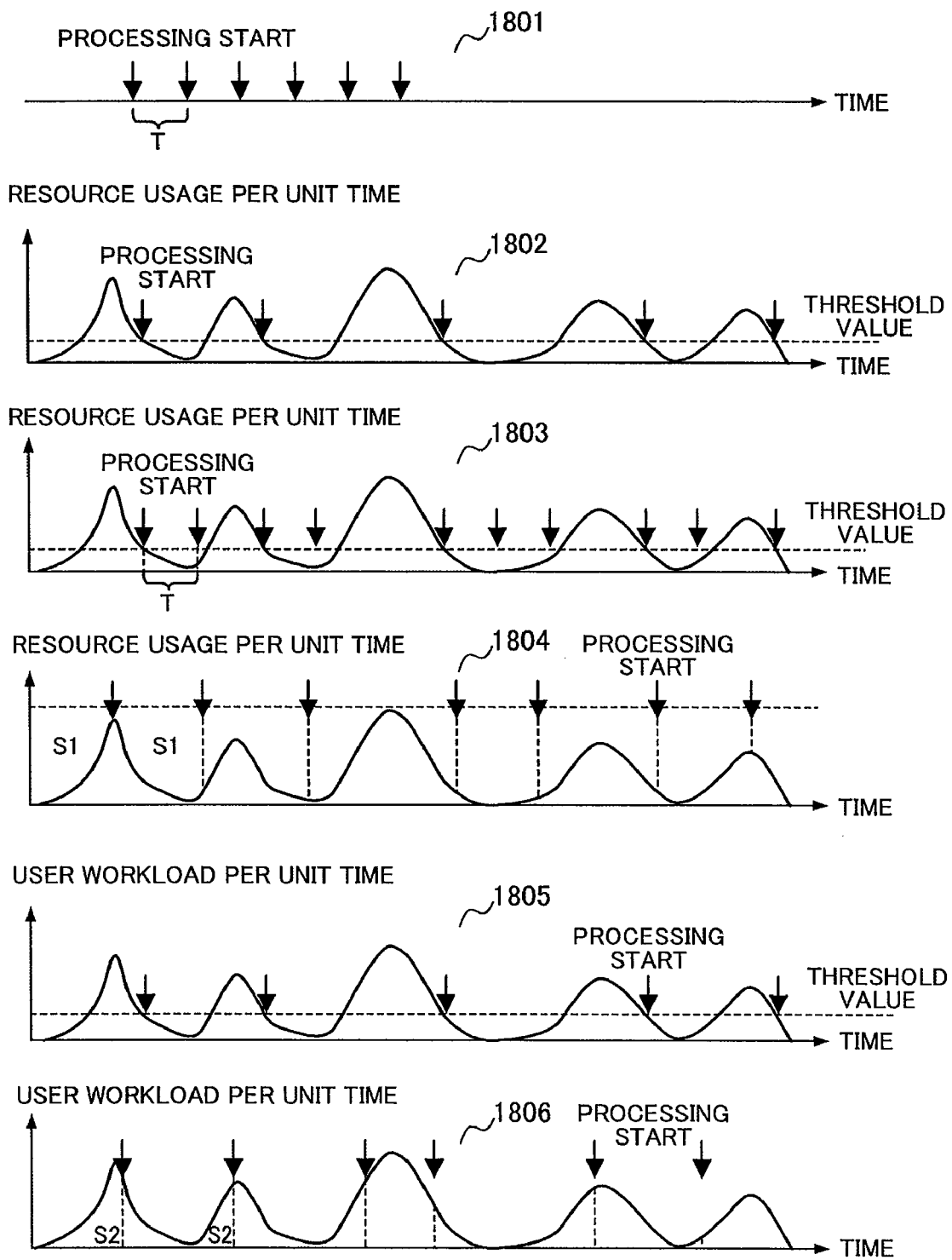
FIG. 18 is a schematic explanatory diagram of a start-up control method of copy processing.

The start-up control method (determination on the start-up of remote copy processing (S1301)) of remote copy processing based on the remote copy function 213 is now explained with reference to FIG. 18.

Remote copy processing may be started each time the volume I/O capture/management function 212 acquires the write data from the volume I/O function 203, or each time it acquires a fixed count.

Alternatively, remote copy processing may be periodically started in predetermined intervals (1801).

Remote copy processing may also be started at the time the computational resource usage in the computer 121 or per unit time in the user OS 202 falls below a predetermined threshold value (1802). Here, computer resource usage refers to the usage, number of sleds of processor queues, and number of hardware interruptions in the CPU 122 of the computer 121; available physical memory size and number of file system caches used in the memory 124; unused areas, access time, read/write operation count and number of read/write requests in the queue in the disk 128; and band usage, number of sent and receive bytes and number of sent and received packets in the network interface 123. If the time fluctuation of these computational resource usages is wide, the fluctuation is smoothed by taking the moving average in the time direction.

Alternatively, remote copy processing may be started in predetermined intervals at the time the computational resource usage in the computer 121 or per unit time in the user OS 202 falls below a predetermined threshold value (1803).

Remote copy processing may also be started at the time the temporal integration value of the unused computational resource in the computer 121 or per unit time in the user OS 202 reaches a predetermined threshold value (1804).

If remote copy processing is started as described above, it is possible to avoid imposing additional burden on the computer 121 or the user OS 202 due to remote copy processing.

Remote copy processing may also be started at the time the user workload in the computer 121 or per unit time in the user OS 202 falls below a predetermined threshold value (1805). The user workload refers to the input count by the user using a keyboard or a mouse. If the time fluctuation of the user workload is wide, the fluctuation is smoothed by taking the moving average in the time direction.

Remote copy processing may also be started at the time the temporal integration value of the user workload in the computer 121 or per unit time in the user OS 202 reaches a predetermined threshold value (1806).

If remote copy processing is started as described above, it is possible to start remote copy processing by following the user workload, and the update of the data volume 129(2) occurring based on the user workload can be reflected in the data volume 131(2) in a timely manner.

Figure 19:
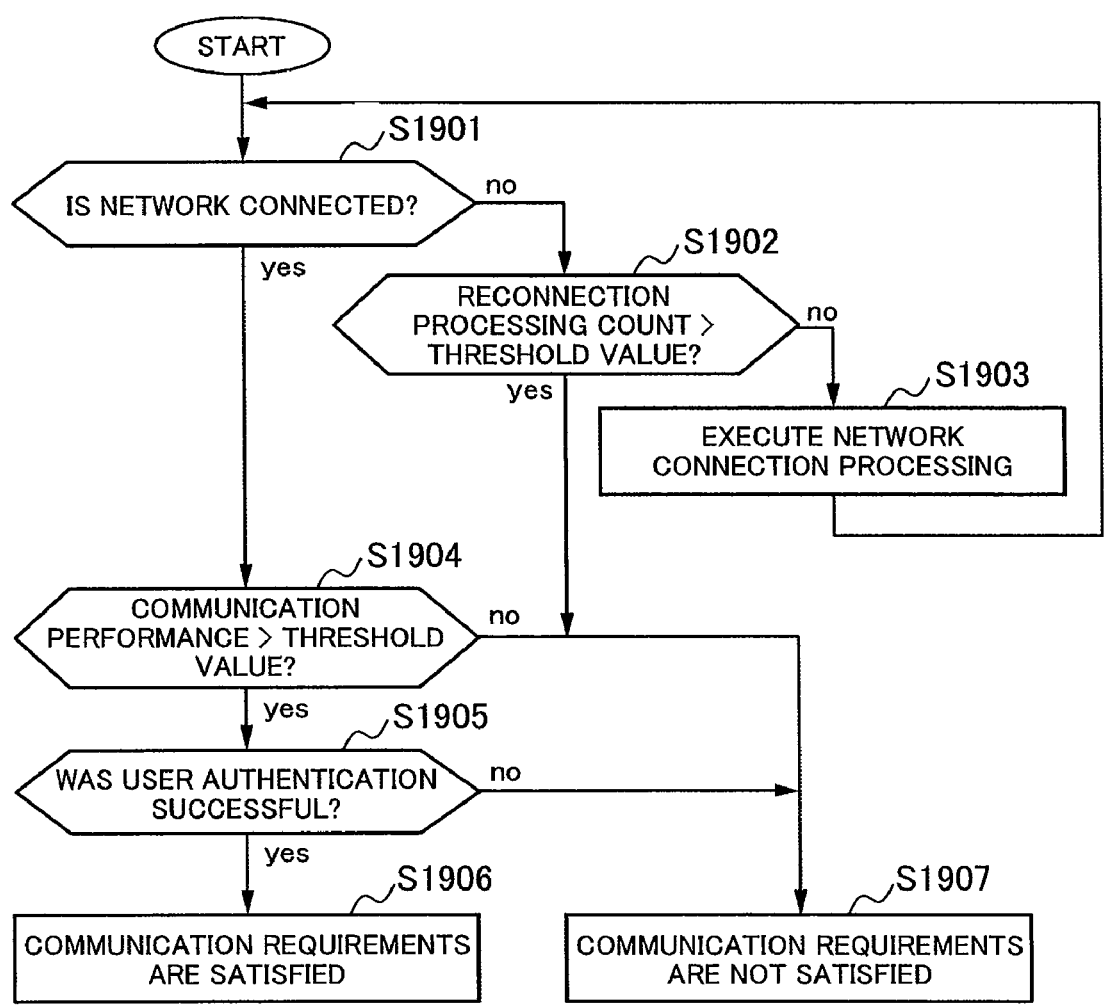
FIG. 19 is a flowchart showing confirmation processing of the communication status.

With reference to FIG. 19, the flow of confirmation processing (processing for determining whether the communication requirements are satisfied (S1304)) of the communication status between the computer 121 and the storage controller 101 is now explained.

The management OS 214 determines the connection status of the computer 121 and the communication network 131 based on the start-up status or the like of the network interface 123 (S1901).

If the computer 121 is not in a connection status with the communication network 131, whether the reconnection processing count is greater than a predetermined threshold value is confirmed (S1902).

If the reconnection processing count is lower than the threshold value, the network connection processing is executed once again (S1903). The network connection processing is performed by searching for the available wireless network base station or the like.

If the reconnection processing count is greater than the threshold value (when attempting to connect to the threshold value count network but failing), it is determined that the communication requirements are not satisfied (S1907).

When it is determined that the computer 121 and the communication network 131 are connected, whether the communication performance between the computer 121 and the storage controller 101 exceeds the predetermined threshold value is confirmed (S1904). Communication performance, for example, refers to the communication delay time or available band between the computer 121 and the storage controller 101.

If the communication performance is lower than the threshold value, it is determined that the communication requirements are not satisfied (S1907). A case where there is no response from the storage controller 101 to a communication request from the computer 121 can also be considered to be lower than the threshold value. Also, a case where a response of communication denial is sent from the storage controller 101 to a communication request from the computer 121 can be treated the same as a case of no response.

Subsequently, authentication of the user of the computer 121 is implemented (S1905). Authentication of the user is performed by using information such as the password set by the user or key data.

It is determined that the communication requirements are not satisfied when the authentication ends in a failure (S1907), and it is determined that the communication requirements are satisfied when the authentication is successful (S1906).

As described above, the information system according to an embodiment of the present invention is configured from a computer 121 comprising a storage device 130, a storage controller 101, and a communication network 131. The computer 121 acquires data to be written into the storage device 130 and manages the update status of the storage device 130, transfers the data written into the storage device 130 to the storage controller 101 independent from the writing of data into the storage device 130 when the computer 121 is in a communicable state with the storage controller 101, and discontinues the transfer of data written into the storage device 130 to the storage controller 101, and manages the transfer status when the computer 121 is not in a communicable state with the storage controller 101.

Further, the computer 121 controls the transfer of data written into the storage device 130 to the storage controller 101 according to the usage of a computational resource provided in the computer 121.

As a result of the foregoing configuration, the computer 121 can preserve the data written into the storage device 130 of the computer 121 even when such computer 121 is placed in a situation where connection to and disconnection from a communication network is repeated.

Data transfer processing of the storage device 130 can be executed without interrupting the processing performed by the application programs 201 or the like in the computer 121.

Accordingly, data of the storage device 130 can be preserved even when the computer 121 is a portable computer, or a computer with limited computational resources such as a CPU.

What is claimed is:

1. An information system comprising:
   a computer comprising a first storage device having one or more logical volumes, an application program, a volume management table, a block area management table, a write data management table, an I/O capture function, and a remote copy function; and
   a storage controller comprising a second storage device having one or more logical volumes,
   wherein the storage controller is connected to the computer via a network,
   wherein a logical volume in the first storage device and a logical volume in the second storage device form a pair in which the logical volume in the first storage device being a primary volume and the logical volume in the second storage device being a secondary volume,
   wherein the volume management table comprises fields indicating the type of a logical volume, a status of the pair, a latest copy time representing the time of the latest copy of the logical volume, and a last copy block ID representing the identifier of a last block area to which the latest copy has been performed, blocks being units obtained by partitioning a logical volume,
   wherein the status of the pair comprises a PAIR status, a SUSPEND status and a SIMPLEX status,
   wherein the PAIR status indicates where the content of the primary volume is reflected in the secondary volume, the SUSPEND status indicates where a copy source manages a difference between the primary volume and the secondary volume, and the SIMPLEX status indicates where the logical volume is not taking part in the remote copy,
   wherein the block area management table comprises fields indicating a block ID representing an identifier of a block area in the secondary volume, bit information representing, with a bit, whether there is a difference between the secondary volume and the primary volume, a block update time representing the update time based on the writing to the block area, and a write data management information address representing the storage position of the entry in the write data management table associated with the block area,
   wherein the write data management table comprises fields indicating the block ID, the write data management information address, a top address representing the top position of a small block area which is obtained by partitioning the block, and an area length representing the size of the small block area,
   wherein when the application program writes data into the first storage device, the I/O capture function captures the writing of the data by filtering the data on the path from the application program to the first storage device,
   wherein when triggered by the I/O capture function capturing the writing of the data, the remote copy function updates the block area management table, updates the write data management table, and executes a first determination whether a communication can be made with the storage controller,
   wherein when it is determined in the first determination that a communication cannot be made, the remote copy function updates the latest copy time and the copy block ID in the volume management table, changes the status of the pair in the volume management table to SUSPEND, and performs the data writing in block units until a communication can be made with the storage controller,
   wherein when it is determined in the first determination that a communication can be made, the remote copy function performs the data, writing in small block units, refers, independently of the data writing, to the volume management table, the block area management table, and the write data management table to perform remote copy to the second storage device in small block units, and
   wherein each time the remote copy in small block units is executed, the remote copy function updates the block area management table and the write data management table, executes a second determination whether a communication can be made with the storage controller and, when it is determined in the second determination that a communication cannot be made with the storage controller, executes the processing that is performed when it is determined in the first determination that a communication cannot be made.

2. The information system according to claim 1, wherein the processing by the remote copy function triggered by the I/O capture function capturing the writing of data is executed each time the I/O capture function captures the writing of data or each time it captures a fixed count.

3. The information system according to claim 1, wherein the remote copy function executes the remote copy processing at predetermined intervals, instead of when triggered by the I/O capture function capturing the writing of data.

4. The information system according to claim 1,
wherein the remote copy function executes the remote copy processing when a computational resources usage per predetermined unit time falls below a predetermined value, instead of when triggered by the I/O capture function capturing the writing of data, and wherein the computational resources usage refers to: the usage, number of sleds of processor queues, or number of hardware interruptions in a CPU in the computer; available physical memory size or number of file system caches used in a memory in the computer, unused areas, access time, read/write operation count and number of read/write requests in the queue in the first storage device; and band usage, number of sent and received bytes and number of sent and received packets in a communication interface in the computer.

5. The information system according to claim 4, wherein the predetermined value is, instead of the computational resource usage per predetermined unit time, a value obtained by smoothing a time fluctuation of the computational resource usage by taking the moving average in the time direction.

6. The information system according to claim 1,
wherein, the remote copy function executes the remote copy processing when a temporal integration value of a computational resource usage per predetermined unit time reaches a predetermined value, instead of when triggered by the I/O capture function capturing the writing of data, and wherein the computational resources usage refers to: the usage, number of sleds of processor queues, or number of hardware interruptions in a CPU in the computer; available physical memory size or number of file system caches used in a memory in the computer, unused areas, access time, read/write operation count and number of read/write requests in the queue in the first storage device; and band usage, number of sent and received bytes and number of sent and received packets in a communication interface in the computer.

7. The information system according to claim 1,
wherein the remote copy function executes the remote copy processing when a user workload per predetermined unit time falls below a predetermined value, instead of when triggered by the I/O capture function capturing the writing of data, and wherein the user workload refers to an input count using a keyboard or a mouse in the computer.

8. The information system according to claim 7,
wherein, the predetermined value is, instead of the user workload per predetermined unit time, a value obtained by smoothing a time fluctuation of the user workload by taking the moving average in the time direction.

9. The information system according to claim 1,
wherein, the remote copy function executes the remote copy processing when a temporal integration value of the user workload per predetermined unit time reaches a predetermined value, instead of when triggered by the I/O capture function capturing the writing of data, and wherein the user workload refers to an input count using a keyboard or a mouse in the computer.

10. The information system according to claim 9 wherein, the first determination and the second determination are made by determining whether a delay time or available band in the communication between the computer and the storage controller exceeds a predetermined value.

* * * * *